United States Patent
Huang et al.

(10) Patent No.: US 10,771,715 B2
(45) Date of Patent: Sep. 8, 2020

(54) CAMERA CONFIGURATION METHOD AND APPARATUS

(71) Applicant: SHENZHEN REALIS MULTIMEDIA TECHNOLOGY CO., LTD, Shenzhen (CN)

(72) Inventors: Yan Huang, Shenzhen (CN); Qiuzi Xu, Shenzhen (CN)

(73) Assignee: SHENZHEN REALIS MULTIMEDIA TECHNOLOGY CO., LTD., Shenzhen (CN)

( * ) Notice: Subject to any disclaimer, the term of this patent is extended or adjusted under 35 U.S.C. 154(b) by 98 days.

(21) Appl. No.: 16/150,248

(22) Filed: Oct. 2, 2018

(65) Prior Publication Data

US 2019/0037147 A1  Jan. 31, 2019

Related U.S. Application Data

(63) Continuation-in-part of application No. 15/561,121, filed as application No. PCT/CN2016/094125 on Aug. 9, 2016, now Pat. No. 10,237,493.

(30) Foreign Application Priority Data

Feb. 13, 2018  (CN) .......................... 2018 1 0151015
Feb. 13, 2018  (CN) .......................... 2018 1 0151020
Feb. 13, 2018  (CN) .......................... 2018 1 0151021
Feb. 13, 2018  (CN) .......................... 2018 1 0151022

(51) Int. Cl.
H04N 5/247 (2006.01)
H04N 17/00 (2006.01)
H04N 5/232 (2006.01)

(52) U.S. Cl.
CPC ......... *H04N 5/247* (2013.01); *H04N 5/23245* (2013.01); *H04N 17/002* (2013.01)

(58) Field of Classification Search
CPC ....................................................... H04N 5/247
USPC ....................................................... 348/211.3
See application file for complete search history.

(56) References Cited

U.S. PATENT DOCUMENTS

2011/0317016 A1* 12/2011 Saeki ................. G08B 13/1968
348/154
2014/0055621 A1   2/2014  Shirani

FOREIGN PATENT DOCUMENTS

| CN | 101251925 A | 8/2008 |
| CN | 102300051 A | 12/2011 |
| CN | 104469322 A | 3/2015 |
| CN | 105279331 A | 1/2016 |
| JP | 2006074260 A | 3/2006 |

* cited by examiner

*Primary Examiner* — Joel W Fosselman
(74) *Attorney, Agent, or Firm* — Anova Law Group, PLLC

(57) ABSTRACT

A camera configuration method includes determining, in a preset view region, a preset number of camera configuration modes and visible cameras of each test point, according to a total number of cameras, calculating one or more cost values of each camera configuration mode, according to one or more factors that affect a capture effect, and calculating a configuration cost value of each camera configuration mode, according to the one or more cost values of each camera configuration mode, to determine a final camera configuration mode.

20 Claims, 27 Drawing Sheets

CAMERA CONFIGURATION METHOD AND APPARATUS

CROSS-REFERENCE TO RELATED APPLICATION

This application is a continuation-in-part (CIP) application of U.S. application Ser. No. 15/561,121, filed on Sep. 25, 2017, which is the National Stage of International Application No. PCT/CN2016/094125, filed on Aug. 9, 2016, claims priority to the entire contents of which are incorporated herein by reference. This application also claims priority to Chinese applications No. 201810151021.1, No. 201810151020.7, No. 201810151022.6, and No. 201810151015.6, all filed on Feb. 13, 2018, the contents of which are incorporated herein by reference.

FIELD OF THE DISCLOSURE

The present disclosure generally relates to the field of computer vision and, more particularly, relates to a method and apparatus for camera configuration.

BACKGROUND

Motion Capture (Mocap) technology involves dimension measurement, position and azimuth measurement of an object in a physical space, etc. By placing trackers at key points of the moving object, the positions of the trackers can be captured by the motion capture system, and the motion capture technology can be used in various fields, such as animation, gait analysis, biomechanics, and ergonomics. In principle, conventional motion capture technologies can be divided into the mechanical type, acoustic type, electromagnetic type, optical type, and so on.

The optical motion capture technology accomplishes the motion capture task by monitoring and tracking a specific optical spot on the target. Conventional optical motion capture technologies are mostly based on computer vision. In theory, for a point in space, as long as it can be seen from two cameras at the same time, the position of the point in space is determined by the images taken by the two cameras at the same time and camera parameters. When the cameras are shooting at a sufficiently high rate, the trajectory of the point can be obtained from the image sequences.

Because the range of activities of the target object being captured is large and there is no restriction from cables and mechanical devices, the optical motion capture system is widely used in various fields including film animation production, large-scale game production, and life science research field, etc. However, the drawback is that the system is expensive, especially the core device of the optical motion capture system, the motion capture camera, is very expensive. Therefore, it is important to reasonably configure an appropriate number of motion capture cameras while ensuring the effect of the motion capture in order to save the cost.

Currently, there seems no effective way to properly configure an appropriate number of motion capture cameras.

BRIEF SUMMARY OF THE DISCLOSURE

In accordance with the disclosure, there is provided a camera configuration method including determining, in a preset view region, a preset number of camera configuration modes and visible cameras of each test point, according to a total number of cameras, calculating one or more cost values of each camera configuration mode, according to one or more factors that affect a capture effect, and calculating a configuration cost value of each camera configuration mode, according to the one or more cost values of each camera configuration mode, to determine a final camera configuration mode.

Also in accordance with the disclosure, there is provided a camera configuration apparatus including a processor; and a memory stored program. The program, when executed, causes the processor to determine, in a preset view region, a preset number of camera configuration modes and visible cameras of each test point, according to a total number of cameras, calculate one or more cost values of each camera configuration mode, according to one or more factors that affect a capture effect, and calculate a configuration cost value of each camera configuration mode, according to the one or more cost values of each camera configuration mode, to determine a final camera configuration mode.

DETAILED DESCRIPTION

In order to make the objectives, technical solutions, and advantages of the present disclosure to be more clearly understood, the following is a detailed description of embodiments of the present disclosure together with the accompanying drawings. It should be understood that the specific embodiments described herein are only used to explain the present disclosure and are not intended to limit the present disclosure.

Herein, the terms "view region," "capture region," "acquisition space," "acquisition space region," "capture space," or the like, are all refer to an action acquisition space of an optical motion capture system. A "preset key acquisition space region" refers to a key region in a specified view region.

The following is a detailed description of embodiments of the present disclosure together with the accompanying drawings.

In the situation where the technical solutions described in the embodiments are not conflicting, they can be combined.

The First Embodiment

Figure 1:
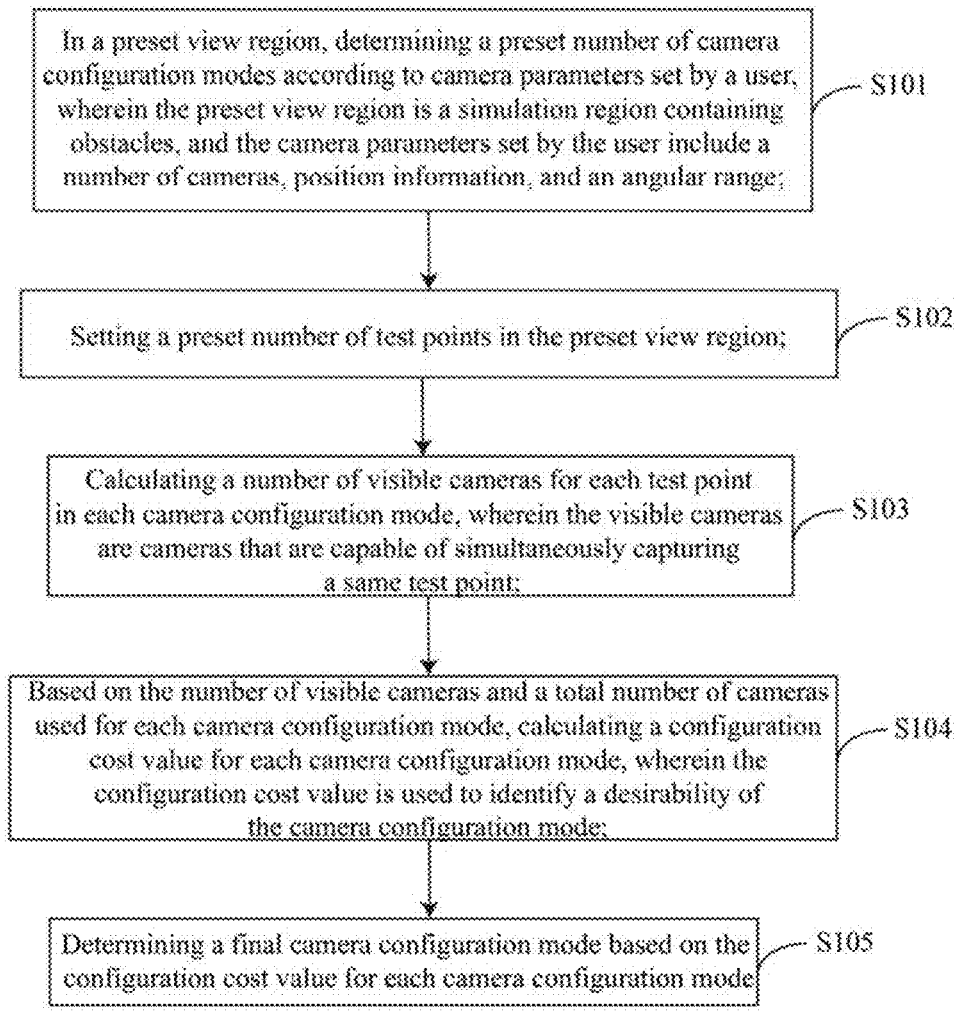
FIG. 1 is a flowchart of a camera configuration method according to a first embodiment of the present disclosure.

FIG. 1 is a flowchart of a camera configuration method according to a first embodiment of the present disclosure. The executing entity of the embodiment of the present disclosure may be a computer device or a functional unit in the computer device. The embodiment of the present disclosure specifically includes steps S101 to S105, as follows.

S101, in a preset view region, determining a preset number of camera configuration modes according to camera parameters set by a user, wherein the preset view region is a simulation region containing obstacles, and the camera parameters set by the user include a number of cameras, position information, and an angular range, etc.;

The preset view region may be a simulation region of any size and created by the user in an optical motion capture system, and the simulation region may include obstacles such as columns and walls. In the preset view region, the user can further set the camera parameters, including the number of cameras, position information, and the angular range, etc.

The camera configuration mode is determined by the camera parameters set by the user. Specifically, by providing the user with a parameter input window, such as a text box, the camera parameters set by user can be received. The camera parameters may include the number of cameras, position information, and the angular range, etc. The possible position and angle of the cameras can be calculated according to the camera parameters. The different calculation results are combined to determine the preset number of camera configuration modes. The preset number of camera configuration modes can be all possible combinations, or some combinations according to the application scenario, which, specifically, can be set according to the need of the actual application. There is no restriction on the preset number of camera configuration modes herein.

Further, because the view region is usually set as a shape of quadrangle or rectangle, the view region usually exhibits a symmetry feature. In this situation, the user only needs to set position information of one camera to generate position information of four or eight cameras, thereby reducing the input amount of camera parameters for the user and improving the efficiency of calculating the preset number of camera configuration modes.

Figure 2:
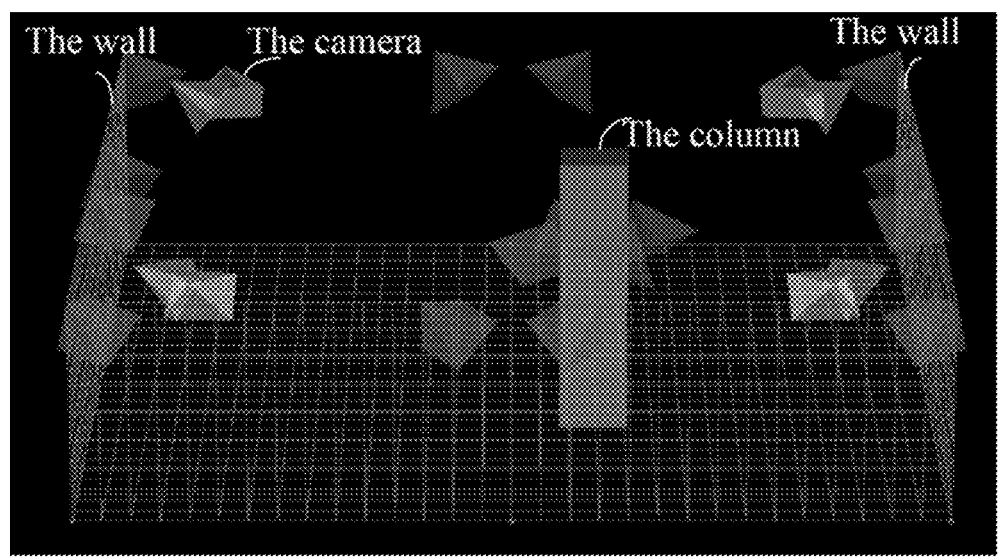
FIG. 2 is a schematic diagram of a camera configuration mode in a specific view region according to the first embodiment of the camera configuration method.

FIG. 2 is a schematic diagram of a camera configuration mode in a specific view region according to the first embodiment of a camera configuration method. A wall is configured on each side around the view region, and a column is provided in the middle of the view region. Pyramid shapes in the entire view region represent the cameras. It should be noted that, in order to facilitate observation, only the walls on the left and right sides are shown in FIG. 2, the walls on the front and rear sides are hidden.

S102, setting a preset number of test points in the preset view region.

The test points can be understood as markers. The markers are special markers or light-emitting points, and are affixed to the target object being captured. The optical motion capture system realizes the motion capture by recognizing the markers and processing the markers data.

Specifically, the preset number of test points may be set in the preset view region. The preset number can be customized according to the application requirements. The larger the preset number is set, the more test points are needed, the longer the test time is required, but the more accurate the test results are achieved.

S103, calculating a number of visible cameras for each test point in each camera configuration mode, wherein the visible cameras are cameras that are capable of simultaneously capturing a same test point.

Specifically, according to the preset number of camera configuration modes determined in step S101, in each camera configuration mode, determining the number of cameras that can capture the same test point, so as to determine the number of visible cameras of the test point.

For example, if the number of visible cameras for a certain test point is three, it means that the test point is within the view range of the three cameras and can be captured by the three cameras at the same time.

It should be noted that, when tracking a marker in a three-dimensional space, at least two cameras are required to capture this point at the same time; otherwise, the marker cannot be tracked. However, in practical applications, the target object being captured wearing the markers tends to move continuously or is easily blocked by obstacles, thus, it is not possible to ensure that the markers in a certain region can be steadily tracked with only two cameras capturing the certain region at the same time. Therefore, it is usually necessary to use two or more cameras capturing the same region at the same time. The tracking effect of the markers in a certain region is proportional to the number of cameras capturing the region at the same time. The more the cameras are used, the better the tracking effect of the markers is achieved, but also the cost is increased. Therefore, it is desired to properly configure the appropriate number of cameras to achieve the best tracking effect at the same time.

S104, based on the number of visible cameras for each test point and a total number of cameras used for each camera configuration mode, calculating a configuration cost value for each camera configuration mode, wherein the configuration cost value is used to identify advantages and disadvantages, or desirability of the camera configuration mode.

It should be noted that the camera parameters set by the user in step S101 include the number of cameras. Therefore, according to the preset number of camera configuration modes determined by the camera parameters set by the user, each camera configuration mode corresponds to a total number of cameras being used. It can be understood that the more the total number of cameras are used, the better the effect of motion capture is achieved, but also the cost is increased. Therefore, it is desired to properly select the total number of cameras to achieve the best motion capture effect at the same time.

Specifically, the configuration cost value is used to identify the advantages and disadvantages of the camera configuration mode. A configuration cost value of each camera configuration mode can be calculated based on the number of visible cameras for each test point (corresponding to a visible cost value) and the total number of cameras used in each camera configuration mode (corresponding to a total cost value). For example, according to the principle that the more the number of visible cameras are used for the test point, the lower the visible cost value is, and the more the total number of cameras are used, the higher the total cost value is, the visible cost value corresponding to each number of visible cameras and the total cost value corresponding to each total numbers of cameras can be set. For each camera configuration mode, the visible cost value for each test point is firstly calculated according to the number of visible cameras of each test point, and then the visible cost values for all test points are accumulated and summed to the total cost values corresponding to the total number of cameras being used, so as to obtain the configuration cost value for the corresponding camera configuration mode.

S105, determining a final camera configuration mode based on the configuration cost value for each camera configuration mode.

Specifically, according to the configuration cost value of each camera configuration mode calculated in step S104, the final camera configuration mode is determined. Generally, the determination principle is that the lower the configuration cost value is, the better the corresponding camera configuration mode is.

It should be noted that, in other embodiments of the present disclosure, a preset range of configuration cost values may also be set. The camera configuration modes in which the configuration cost values belong to the preset range of configuration cost values may be obtained. The final camera configuration mode from the camera configuration mode in which the configuration cost values belong to the preset range of configuration cost values can be determined. When there are at least two camera configuration modes that have configuration cost values within the preset range of configuration cost values, either of the two camera configuration modes that meet the criteria can be chosen as the final camera configuration mode, or the one with the lower or lowest configuration cost value from the two camera configuration modes can be selected as the final camera configuration mode.

In the embodiment of the present disclosure, the number of visible cameras for each test point is calculated for each camera configuration mode in the preset view region. According to the number of visible cameras for each test point and the total number of cameras used for each camera configuration mode, the configuration cost value for each camera configuration mode can then be calculated. The final camera configuration mode can be determined based on the configuration cost values. Accordingly, an effective way to properly configure the appropriate number of motion capture cameras is provided, taking into account both the number of visible cameras and the total number of cameras being used, as well as their effect on mutual restraint between the effect of motion capture and the cost. The cost can be effectively saved while ensuring the effect of motion capture.

The Second Embodiment

Figure 3:
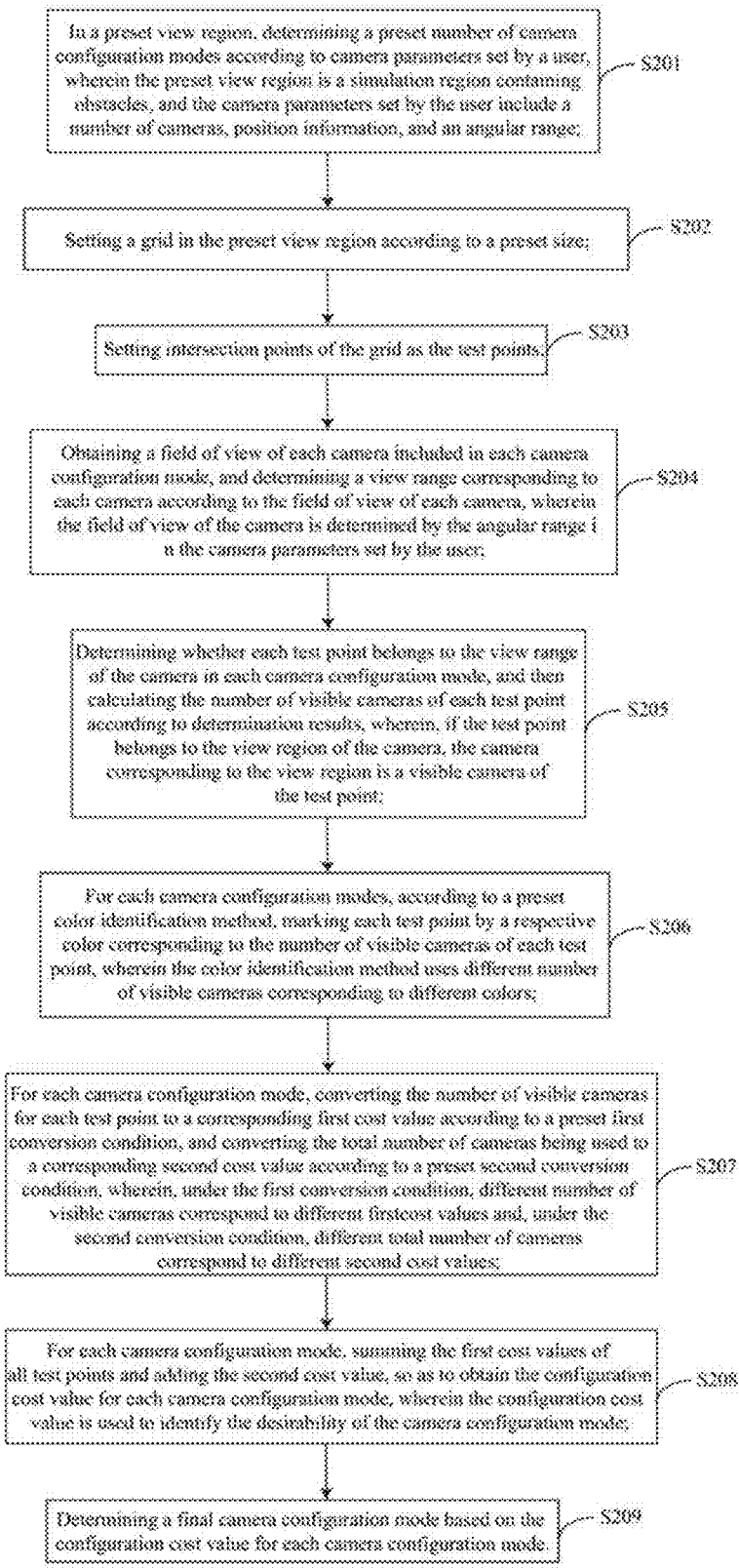
FIG. 3 is a flowchart of a camera configuration method according to a second embodiment of the present disclosure.

FIG. 3 is a flowchart of a camera configuration method according to a second embodiment of the present disclosure. The executing entity of the embodiment of the present disclosure may be a computer device or a functional unit in the computer device. The embodiment of the present disclosure specifically includes steps S201 to S209, as follows.

S201, in a preset view region, determining a preset number of camera configuration modes according to camera parameters set by a user, wherein the preset view region is a simulation region containing obstacles, and the camera parameters set by the user include a number of cameras, position information, and an angular range, etc.;

The preset view region may be a simulation region of any size and created by the user in an optical motion capture system, and the simulation region may include obstacles such as columns and walls. In the preset view region, the user can further set the camera parameters, including the number of cameras, position information, and the angular range, etc.

The camera configuration mode is determined by the camera parameters set by the user. Specifically, by providing the user with a parameter input window, such as a text box, the camera parameters set by user can be received. The camera parameters may include the number of cameras, position information, and the angular range, etc. The possible position and angle of the cameras can be calculated according to the camera parameters. The different calculation results are combined to determine the preset number of camera configuration modes. The preset number of camera configuration modes can be all possible combinations, or some combinations according to the application scenario, which, specifically, can be set according to the need of the actual application. There is no restriction on the preset number of camera configuration modes herein.

Further, because the view region is usually set as a shape of quadrangle or rectangle, the view region usually exhibits a symmetry feature. In this situation, the user only needs to set position information of one camera to generate position information of four or eight cameras, thereby reducing the input amount of camera parameters for the user and improving the efficiency of calculating the preset number of camera configuration modes.

FIG. 2 is a schematic diagram of a camera configuration mode in a specific view region according to the first embodiment of a camera configuration method. A wall is configured on each side around the view region, and a column is provided in the middle of the view region. Pyramid shapes in the entire view region represent the cameras. It should be noted that, in order to facilitate observation, only the walls on the left and right sides are shown in FIG. 2, the walls on the front and rear sides are hidden.

S202, setting a grid in the preset view region according to a preset size.

In the preset view region, a sufficient number of test points can be obtained by drawing the grid (e.g., a square grid).

Specifically, the grid is set according to the preset size in the preset view region. The preset size can be customized according to the actual application. The larger the size is; the smaller the density of the grid is; the less the number of obtained test points are; the relatively larger error of the final camera configuration mode obtained from the test results of the test points is; but the shorter the calculation time is needed. To the contrary, the smaller the size is; the larger the density of the grids is; the more the obtained test points are; the relatively smaller error of the final camera configuration mode obtained from the test results of the test points is; but the longer the calculation time is needed.

S203, setting intersection points of the grid as the test points.

The test points can be understood as markers. The markers are special markers or light-emitting points, and are affixed to the target object being captured. The optical motion capture system realizes the motion capture by recognizing the markers and processing the markers data.

Specifically, the intersection points of the grid configured in step S202 are used as the test points.

S204, obtaining a field of view of each camera included in each camera configuration mode, and determining a view range corresponding to each camera according to the field of view of each camera, wherein the field of view of the camera is determined by the angular range in the camera parameters set by the user.

Figure 4:
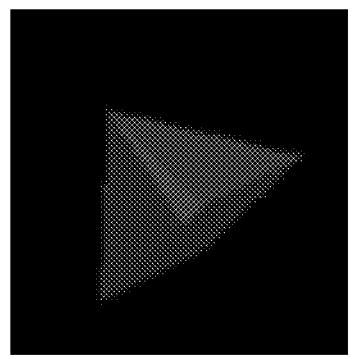
FIG. 4 is a schematic diagram of a camera and its view range according to the second embodiment of the camera configuration method.
Figure 5:
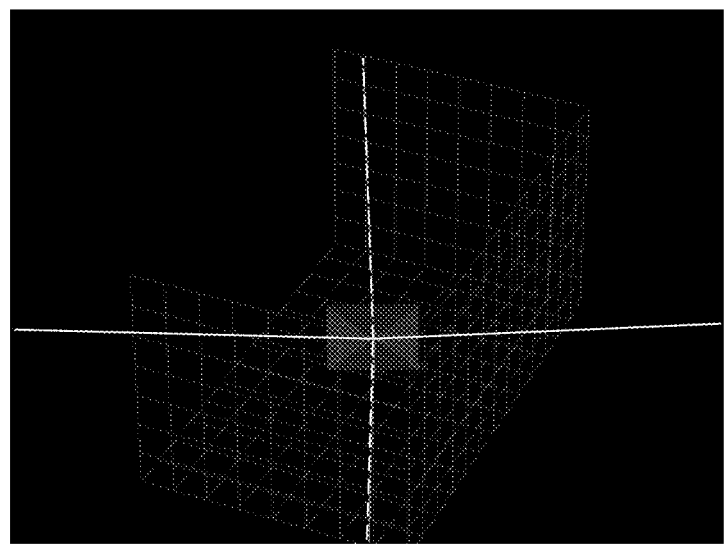
FIG. 5 is a schematic diagram of a specific camera and its view range observed from one view angle according to the second embodiment of the camera configuration method.

Specifically, according to each camera configuration mode determined by the camera parameters set by the user, the field of view of the camera is determined by the angular range in the camera parameters. The field of view of the camera includes a horizontal-axis field of view and a longitudinal-axis field of view. When the position and angle of the camera are fixed, accordingly, the horizontal-axis field of view and the longitudinal-axis field of view can be determined. The view range of the camera can be determined based on the field of view of the camera acquired. FIGS. 4 and 5 specified the field of view of the camera and the corresponding view range.

FIG. 4 shows a schematic diagram of a camera and its view range. As shown in FIG. 4, the view range of the camera can be seen as a pyramid-shaped region in which the camera is identified by the shape of the pyramid. The bottom of the pyramid can be regarded as a lens plane of the camera. The region extending from the top of the pyramid along the four sides of the pyramid is the view range of the camera.

FIG. 5 is a schematic diagram of a specific camera observed from one view angle and its view range. As shown in FIG. 5, in the preset view region, a current camera is identified by the pyramid shape, and an angle from the top of the pyramid along the left and right sides of the pyramid is the horizontal-axis field of view of the current camera, i.e., the angle between the two white solid lines in FIG. 5. An angle from the top of the pyramid along the upper and lower sides of the pyramid is the longitudinal-axis field of view of the current camera, i.e., the angle between the two white dotted lines in FIG. 5. The region formed by the horizontal-axis field of view and the longitudinal-axis field of view is the view range of the current camera.

S205, determining whether each test point belongs to the view range of the camera in each camera configuration mode, and then calculating the number of visible cameras of each test point according to determination results, wherein, if the test point belongs to the view region of the camera, the camera corresponding to the view region is a visible camera of the test point.

Figure 6:
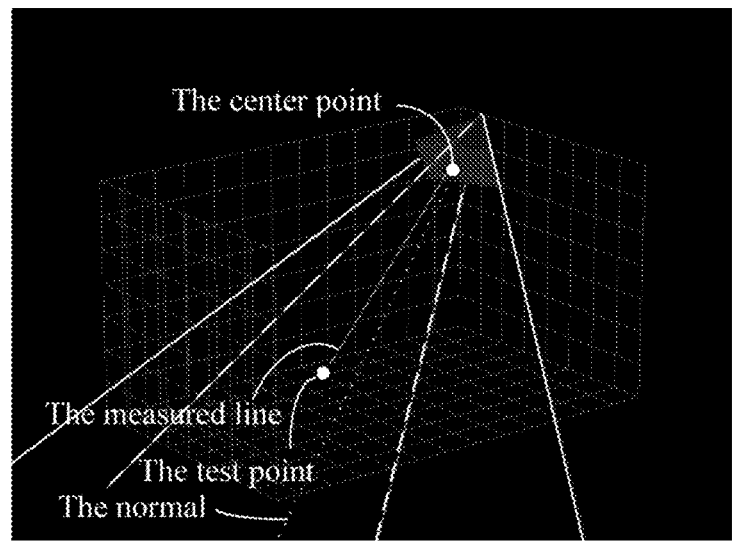
FIG. 6 is a schematic diagram of a specific camera and its view range observed from another view angle according to the second embodiment of the camera configuration method.

FIG. 6 is a schematic diagram of a current camera observed from a view angle after 180 degrees of rotation of the view region of FIG. 5 and its view range. In FIG. 6, a normal is the dotted line perpendicular to the camera lens plane, and a measured line is the connection between the test point and the center point.

Specifically, determining whether each test point belongs to the view range of the camera in each camera configuration mode can be achieved through the following process. The detailed description is as follows.

For each test point in each camera configuration mode, traverse all cameras included in the camera configuration mode, and determine whether the test point meets the following visual criteria a1) to a5) for each camera:

a1) in a user coordinate system established by using the current camera as a reference, a third-dimension coordinate value of the test point is negative.

Referring to FIG. 6, in the user coordinate system established by using the current camera as the reference, the positive direction of the third-dimension coordinate is the positive direction of the normal of the lens plane of the current camera. If the third-dimension coordinate value of the test point is negative, it is determined that the test point is not within the view range of the current camera.

a2) a distance between the test point and the center point of the lens plane of the current camera is greater than a preset distance threshold.

Referring to FIG. 6, if the distance between the test point and the center point is greater than the preset distance threshold, it is determined that the test point is not within the view range of the current camera.

The distance threshold can be customized according to the needs of the actual application and the performance of the camera.

a3) a horizontal angle between the measured line and the normal of the lens plane of the current camera is greater than one half of the horizontal-axis field of view of the view range of the current camera, where the measured line is the connection of the test point to the center point of the lens plane of the current camera.

Referring to FIG. 6, through a vector resolution of the angle between the measured line and the normal line, the horizontal angle and the longitudinal angle between the measured line and the normal line can be obtained. If the horizontal angle between the measured line and the normal is greater than one-half of the horizontal-axis field of view, it is determined that the test point is not within the view range of the current camera.

a4) a longitudinal angle between the measured line and the normal of the lens plane of the current camera is greater than one-half of the longitudinal-axis field of view of the view range of the current camera.

Referring to FIG. 6, if the longitudinal angle between the measured line and the normal is greater than one-half of the longitudinal-axis field of view, it is determined that the test point is not within the view range of the current camera.

a5) a position of the obstacle in the view region belongs to the line segment formed between the test point and the center point of the lens plane of the current camera.

Because a user-set obstacle is in the view region, if the position of the obstacle is exactly on the line segment formed between the test point and the center point in FIG. 6, it is determined that the test point is not within the view range of the current camera.

According to the above criteria on the visual conditions a1) to a5), if the test point satisfies any of the above visual conditions a1) to a5), it is determined that the test point is not within the view range of the current camera, i.e., cannot be captured by the current camera. If the test point does not satisfy any of the above visual conditions a1) to a5), it is determined that the test point is within the view range of the current camera, i.e., can be captured by the current camera, and the current camera is recognized as the visible camera corresponding to the test point.

Based on the determination results mentioned-above, the number of visible cameras for each test point is obtained by traversing all the test points in each camera configuration mode.

For example, if the number of visible cameras for a certain test point is three, it means that the test point is within the view range of the three cameras and can be captured by the three cameras at the same time.

S206, for each camera configuration modes, according to a preset color identification method, marking each test point by a respective color corresponding to the number of visible cameras of each test point, wherein the color identification method uses different number of visible cameras corresponding to different colors.

In order to enable the user to more intuitively understand the result of the calculation of step S205, the number of visible cameras of the test point can be visualized by the color identification method.

Specifically, the color identification method may be the different number of visible cameras corresponding to different colors. That is, the different numbers of visible cameras are represented by different colors. For example, red represents that the number of visible cameras for the test point is zero, yellow represents that the number of visible cameras for the test point is one, green indicates that the number of visible cameras for the test point is two, blue indicates that the number of visible cameras for the test point is three, and white indicates that the number of visible cameras for the test point is any number greater than or equal to four.

Specifically, for each camera configuration mode, according to the preset color identification method, a corresponding color is selected for each number of visible cameras. According to the results calculated in step S205, each of the test points is marked by the respective color corresponding to the number of visible cameras of each test point. For example, if the test point is marked as red, it means that the test point cannot be taken by any camera. If the test point is marked as blue, then the test point can be captured by three cameras at the same time.

With this color identification method, the user can visually understand the pros and cons of the current camera configuration mode by looking at the distribution of the colors in the view region.

S207, for each camera configuration mode, converting the number of visible cameras for each test point to a corresponding first cost value according to a preset first conversion condition, and converting the total number of cameras being used to a corresponding second cost value according to a preset second conversion condition, wherein, under the first conversion condition, different number of visible cameras correspond to different first cost values and, under the second conversion condition, different total number of cameras correspond to different second cost values.

The preset first conversion condition may be different number of visible cameras corresponding to different first cost values. That is, different first cost values corresponding to the different number of visible cameras. Specific configuration of the relationship between the number of visible cameras and the first cost value can be customized according to the needs of the actual application.

For example, the first cost value of the test point with zero visible cameras may be set as 10000. Because if the number of visible cameras for the test point is zero, it means that the test point cannot be seen by any camera in the view region, thus, a higher first cost value may be set to indicate that the camera configuration corresponding to this situation is not desirable. The first cost values of the test points with one visible camera can be set as 100; the first cost values of the test points with two visible cameras can be set as 10; the first cost values of the test points with three visible cameras can be set as 1.

The preset second conversion condition may be different total number of cameras corresponding to different second cost values. That is, different second cost values corresponding to different total number of cameras. Specific configuration of the relationship between the total number of cameras and the second cost value can be customized according to the needs of the actual application.

For example, in the camera parameters set by the user in step S201, the total number of cameras is in the range of 20 to 25. The higher total number of cameras represents the higher cost of the corresponding camera configuration mode; therefore, a higher second cost value may be set. The second cost value of the camera configuration mode using 20 cameras can be set as a; the second cost value of the camera configuration mode using 21 cameras can be set as b; the second cost value of the camera configuration mode using 22 cameras can be set as c; the second cost value of the camera configuration mode using 23 cameras can be set as d; the second cost value of the camera configuration mode using 24 cameras can be set as e; the second cost value of the camera configuration mode using 25 cameras can be set as f; where the specific values of a, b, c, d, e, and f can be set according to the actual application, and are satisfied $0<a<b<c<d<e<f$.

S208, for each camera configuration mode, summing the first cost values of all test points and adding the second cost value, so as to obtain the configuration cost value for each camera configuration mode, wherein the configuration cost value is used to identify the desirability of the camera configuration mode.

Specifically, in each camera configuration mode, the first cost value of each test points can be obtained according to step S207, the first cost values of all the test points are summed and summed to the second cost value to obtain the configuration cost value of each camera configuration mode, where the configuration cost value is used to identify the advantages and disadvantages of the camera configuration mode.

The specific algorithm for adding the first and second cost values can be customized according to the needs of the specific application. For example, the sum of the first cost values of all the test points can be summed to the second cost values in proportion.

S209, a final camera configuration mode is determined according to the configuration cost value for each camera configuration mode.

Specifically, the final camera configuration mode is further determined according to the configuration cost value of each camera configuration mode obtained in step S208.

For example, according to the conversion conditions for the first cost value and the second cost value enumerated in step S207, the configuration cost value of each camera configuration mode is calculated in accordance with step S208. It can be understood that the minimum configuration cost value of the corresponding camera configuration mode is the optimal one. That is, the final camera configuration mode can be the camera configuration corresponding to the minimum configuration cost value.

It should be noted that, in the present embodiment, step S206 and step S207 may be performed in parallel.

In the present embodiment, firstly, the number of visible cameras for each test point is calculated for each camera configuration mode in the preset view region. According to a preset first conversion condition, convert the number of visible cameras for each test point to a corresponding first cost value, and according to a preset second conversion condition, convert the total number of cameras being used to a corresponding second cost value. Then, the first cost values of all the test points are summed and summed to the second cost value to obtain the configuration cost value of each camera configuration mode. The final camera configuration mode can be determined based on the configuration cost values. Accordingly, an effective way to properly configure the appropriate number of motion capture cameras is provided, taking into account both the number of visible cameras and the total number of cameras being used, as well as their effect on mutual restraint between the effect of motion capture and the cost. The cost can be effectively saved while ensuring the effect of motion capture. Secondly, in each camera configuration mode, according to a preset color identification method, each test point is marked by the respective color corresponding to the number of visible cameras of each test point. The user can visually understand the advantages and disadvantages of the current camera configuration by looking at the distribution of the colors in the view region. The visualization of the camera configuration is enhanced. Thirdly, a grid in the preset view region is set according to a preset size. Intersection points of the grid are set as test points. A flexible set of test points is achieved by effectively adjusting the density of the test points, and the best test results can be achieved.

The Third Embodiment

Figure 7:
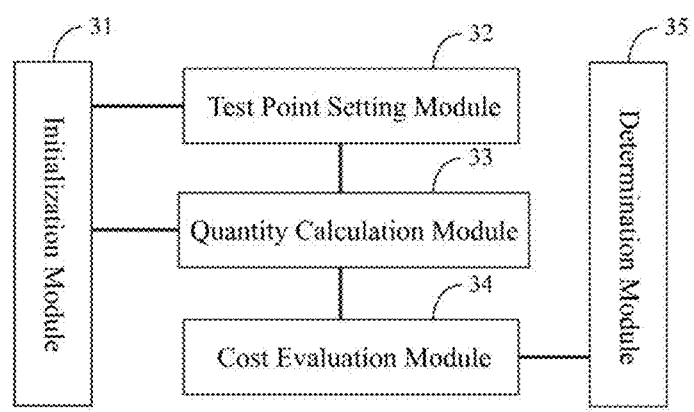
FIG. 7 is a schematic diagram of a camera configuration apparatus according to a third embodiment of the present disclosure.

FIG. 7 is a schematic diagram of a camera configuration apparatus according to a third embodiment of the present disclosure. Only portions related to the embodiments of the present disclosure are shown for the convenience of explanation. A camera configuration apparatus according to the embodiment in FIG. 7 may be the executing entity of the camera configuration method provided in the first embodiment, which may be a computer apparatus or a functional unit in a computer apparatus. A camera configuration apparatus according to the embodiment in FIG. 7 includes an initialization module 31, a test point setting module 32, a quantity calculation module 33, a cost calculation module 34, and a selection module 35. The functional units are described in detail as follows.

The initialization module 31 is configured, in a preset view region, to determine a preset number of camera configuration modes according to camera parameters set by a user, wherein the preset view region is a simulation region containing obstacles, and the camera parameters set by the user include a number of cameras, position information, and an angular range.

The test point setting module 32 is configured to set a preset number of test points in the preset view region.

The quantity calculation module 33 is configured to calculate a number of visible cameras for each test point in each camera configuration mode, wherein the visible cameras are cameras that are capable of simultaneously capturing a same test point.

The cost evaluation module 34 is configured, based on the number of visible cameras for each test point and a total number of cameras used for each camera configuration mode, to calculate a configuration cost value for each camera configuration mode, wherein the configuration cost value is used to identify a desirability of the camera configuration mode.

The selection module 35 is configured to determine a final camera configuration mode based on the configuration cost value for each camera configuration mode.

The present embodiment provides a process for realizing the respective function of each unit in one camera configuration apparatus, and reference may be made to the description of the embodiment in FIG. 1, which is not specifically described herein.

Referring to the embodiment of a camera configuration apparatus in FIG. 7, in the present embodiment, the number of visible cameras for each test point is calculated for each camera configuration mode in the preset view region. According to the number of visible cameras for each test point and the total number of cameras used for each camera configuration mode, the configuration cost value for each camera configuration mode can then be calculated. The final camera configuration mode can be determined based on the configuration cost values. Accordingly, an effective way to properly configure the appropriate number of motion capture cameras is provided, taking into account both the number of visible cameras and the total number of cameras being used, as well as their effect on mutual restraint between the effect of motion capture and the cost. The cost can be effectively saved while ensuring the effect of motion capture.

The Fourth Embodiment

Figure 8:
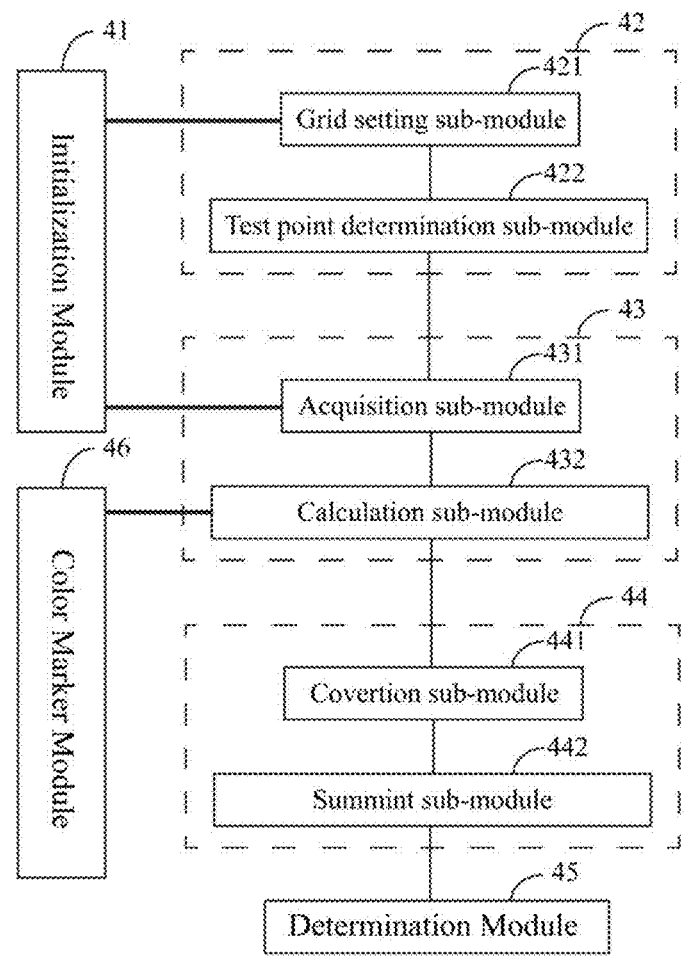
FIG. 8 is a schematic diagram of a camera configuration apparatus according to a fourth embodiment of the present disclosure.

FIG. 8 is a schematic diagram of a camera configuration apparatus according to a fourth embodiment of the present disclosure. Only portions related to the embodiments of the present invention are shown for the convenience of explanation. A camera configuration apparatus according to the embodiment in FIG. 8 may be the executing entity of the camera configuration method provided in the second embodiment, which may be a computer apparatus or a functional unit in a computer apparatus. A camera configuration apparatus according to the embodiment in FIG. 8 includes an initialization module 41, a test point setting module 42, a quantity calculation module 43, a cost calculation module 44, and a selection module 45. The functional units are described in detail as follows:

The initialization module 41 is configured, in a preset view region, to determine a preset number of camera configuration modes according to camera parameters set by a user, wherein the preset view region is a simulation region containing obstacles, and the camera parameters set by the user include a number of cameras, position information, and an angular range. The test point setting module 32 is configured to set a preset number of test points in the preset view region.

The test point setting module 42 is configured to set a preset number of test points in the preset view region.

The quantity calculation module 43 is configured to calculate a number of visible cameras for each test point in each camera configuration mode, wherein the visible cameras are cameras that are capable of simultaneously capturing a same test point.

The cost evaluation module 44 is configured, based on the number of visible cameras for each test point and a total number of cameras used for each camera configuration mode, to calculate a configuration cost value for each camera configuration mode, wherein the configuration cost value is used to identify a desirability of the camera configuration mode.

The selection module 45 is configured to determine a final camera configuration mode based on the configuration cost value for each camera configuration mode.

The quantity calculation module 43 further includes:

an acquisition sub-module 431, configured to obtain a field of view of each camera included in each camera configuration mode, and to determine a view range corresponding to each camera according to the field of view of each camera, wherein the field of view of the camera is determined by the angular range in the camera parameters set by the user; and a calculation sub-module 432, configured to determine whether each test point belongs to the view range of the camera in each camera configuration mode, and then to calculate the number of visible cameras of each test point according to determination results, wherein, if the test point belongs to the view region of the camera, the camera corresponding to the view region is a visible camera of the test point.

The cost evaluation module 44 further includes:

a conversion sub-module 441, configured, for each camera configuration mode, to convert the number of visible cameras for each test point to a corresponding first cost value according to a preset first conversion condition, and to convert the total number of cameras being used to a corresponding second cost value according to a preset second conversion condition, wherein, under the first conversion condition, different number of visible cameras correspond to different first cost values and, under the second conversion condition, different total number of cameras correspond to different second cost values; and a summing sub-module 442, configured, for each camera configuration mode, to sum the first cost values of all test points and to add the second cost value, so as to obtain the configuration cost value for each camera configuration mode, wherein the configuration cost value is used to identify the desirability of the camera configuration mode.

The camera configuration apparatus further includes:

a color marker module 46, configured, for each camera configuration modes, according to a preset color identification method, to mark each test point by a respective color corresponding to the number of visible cameras of each test point, wherein the color identification method uses different number of visible cameras corresponding to different colors.

The test point setting module 42 further includes:

a grid setting sub-module, configured to set a grid in the preset view region according to a preset size; and a test point determination sub-module, configured to set intersection points of the grid as the test points.

The present embodiment provides a process for realizing the respective function of each unit in one camera configuration apparatus, and reference may be made to the description of the embodiment in FIG. 3, which is not specifically described herein.

Referring to the embodiment of a camera configuration apparatus in FIG. 8, firstly, the number of visible cameras for each test point is calculated for each camera configuration mode in the preset view region. According to a preset first conversion condition, convert the number of visible cameras for each test point to a corresponding first cost value, and according to a preset second conversion condition, convert the total number of cameras being used to a corresponding second cost value. Then, the first cost values of all the test points are summed and summed to the second cost value to obtain the configuration cost value of each camera configuration mode. The final camera configuration mode can be determined based on the configuration cost values. Accordingly, an effective way to properly configure the appropriate number of motion capture cameras is provided, taking into account both the number of visible cameras and the total number of cameras being used, as well as their effect on mutual restraint between the effect of motion capture and the cost. The cost can be effectively saved while ensuring the effect of motion capture. Secondly, in each camera configuration mode, according to a preset color identification method, each test point is marked by the respective color corresponding to the number of visible cameras of each test point. The user can visually understand the advantages and disadvantages of the current camera configuration by looking at the distribution of the colors in the view region. The visualization of the camera configuration is enhanced. Thirdly, a grid in the preset view region is set according to a preset size. Intersection points of the grid are set as test points. A flexible set of test points is achieved by effectively adjusting the density of the test points, and the best test results can be achieved.

The Fifth Embodiment

Figure 9:
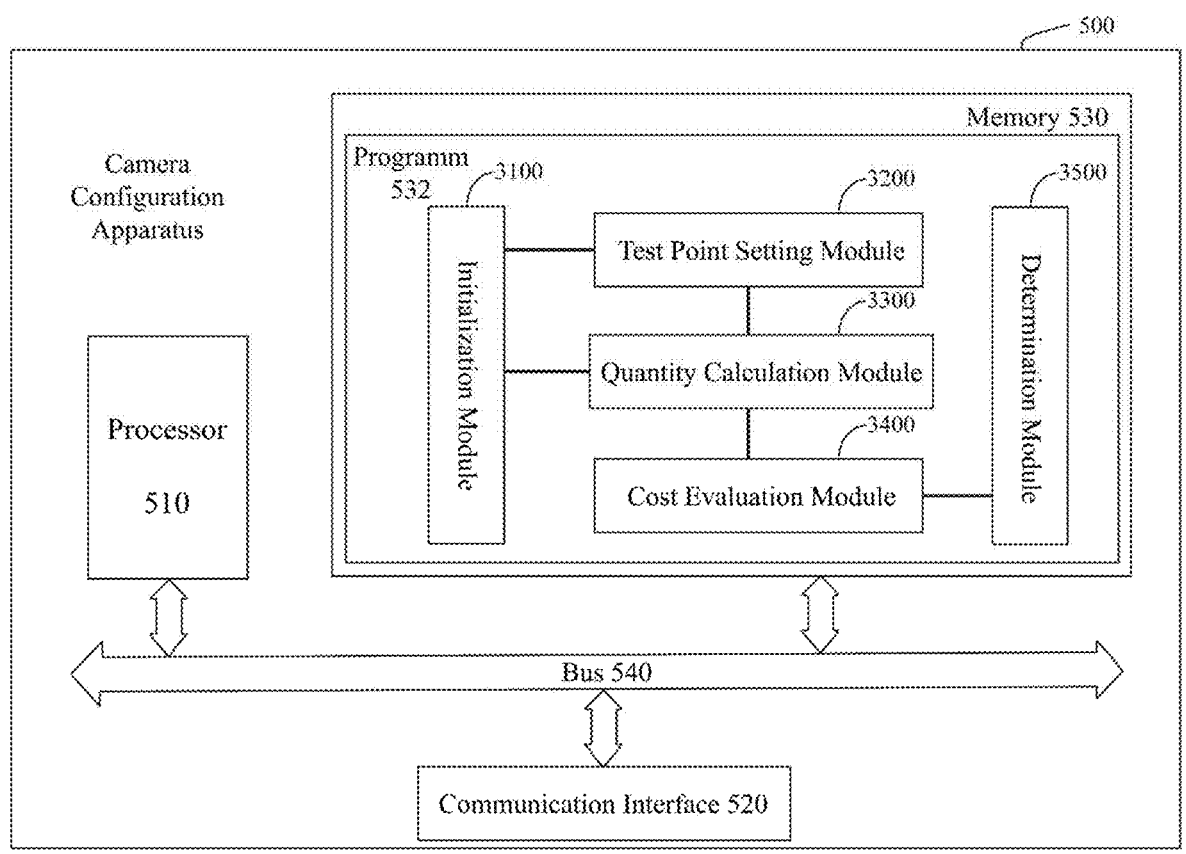
FIG. 9 is a schematic diagram of a camera configuration apparatus according to a fifth embodiment of the present disclosure.

Referring to FIG. 9, the embodiment of the present disclosure provides a schematic diagram of a camera configuration apparatus 500. The camera configuration apparatus 500 may be a computer apparatus or a functional unit in a computer apparatus, and the specific embodiment of the disclosure does not define the specific implementation of the camera configuration apparatus. The camera configuration apparatus 500 includes: a processor 510, a communication interface 520, a memory 530, and a bus 540.

The processor 510, the communication interface 520, and the memory 530 communicate with each other through the bus 540.

The communication interface 520 is configured to communicate with an external device, such as a personal computer, a server, or the like.

The processor 510 is configured to execute a program 532.

In particular, the program 532 may include program code. The program code includes computer operation instructions.

The processor 510 may be a central processing unit CPU, either an Application Specific Integrated Circuit (ASIC) or one or more integrated circuits configured to implement embodiments of the present disclosure.

The memory 530 is configured to store the program 532. The memory 530 may contain high-speed RAM memory, and may also include non-volatile memory, such as at least one disk memory. The program 532 may include:

an initialization module 3100 configured, in a preset view region, to determine a preset number of camera configuration modes according to camera parameters set by a user, wherein the preset view region is a simulation region containing obstacles, and the camera parameters set by the user include a number of cameras, position information, and an angular range;

a test point setting module 3200 configured to set a preset number of test points in the preset view region;

a quantity calculation module 3300 configured to calculate a number of visible cameras for each test point in each camera configuration mode, wherein the visible cameras are cameras that are capable of simultaneously capturing a same test point;

a cost evaluation module 3400 configured, based on the number of visible cameras for each test point and a total number of cameras used for each camera configuration mode, to calculate a configuration cost value for each camera configuration mode, wherein the configuration cost value is used to identify a desirability of the camera configuration mode.

a selection module 3500 configured to determine a final camera configuration mode based on the configuration cost value for each camera configuration mode.

The specific implementation of each unit in the program 532 can be referred to the corresponding unit in the embodiment shown in FIG. 7 and will not be described herein.

On the basis of the first embodiment and the second embodiment, other factors that affect the capture effect of the camera configuration mode will be taken into account in the following embodiments.

The Sixth Embodiment

Figure 10:
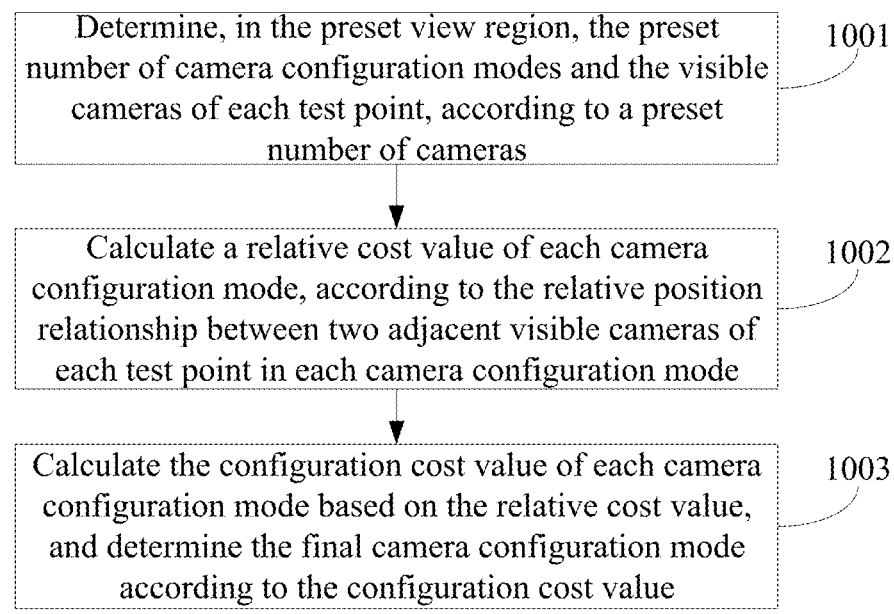
FIG. 10 is a flowchart of a camera configuration method according to a sixth embodiment of the present disclosure.

FIG. 10 is a flowchart of another camera configuration method consistent with the disclosure. The executing entity may be a computer device or a functional unit in the computer device. On the basis of the first embodiment and the second embodiment, the impact of a relative position relationship between each two adjacent visible cameras of each test point on the capture effect of each camera configuration mode are taken into account, when calculating the configuration cost value.

As shown in FIG. 10, at S1001, in the preset view region, determining the preset number of camera configuration modes and the visible cameras of each test point, according to a total number of cameras.

The preset view region may be a simulation region of any size that is created by the user in an optical motion capture system, and the simulation region may include obstacles, such as columns and walls. In the preset view region, the user can further set the camera parameters, including the number of cameras or the like. The number of cameras can be set according to the actual needs.

The camera configuration modes can be determined by the camera parameters set by the user. The possible arrangement position and angle of each camera can be calculated according to the camera parameters. The different calculation results can be combined to determine the preset number of camera configuration modes. The preset number of camera configuration modes can include all possible combinations, or some combinations, according to the application scenario, which, specifically, can be set according to the need of the actual application. It is not intended to limit the preset number of camera configuration modes here.

The view region can be set as a shape of quadrangle or rectangle, and hence the view region generally exhibits a symmetry feature. In this situation, the user only needs to set position information of one camera to generate position information of four or eight cameras, thereby reducing the input amount of camera parameters for the user and improving the efficiency of calculating the preset number of camera configuration modes.

The test points can include the markers. The markers can include special markers or light-emitting points and can be affixed to the target object being captured. The optical motion capture system can realize the motion capture by recognizing the markers and processing the markers data. In some embodiments, the preset number of test points may be set in the preset view region. The preset number can be customized according to the application requirements. A larger preset number corresponds to more test points and a longer test time, but more accurate test results.

In each camera configuration mode, the number of cameras that can capture the same test point can be determined, such that the number of visible cameras of each test point can be determined.

At S1002, a relative cost value of each camera configuration mode is calculated, according to the relative position relationship between each two adjacent visible cameras of each test point in each camera configuration mode.

The camera parameters set by the user can include the position of each camera. Different positions of each camera may have different capture effects. Therefore, when calculating the configuration cost value of each camera configuration mode, the impact of the relative position relationship between each two adjacent visible cameras of each test point on the capture effect needs to be considered.

In some embodiments, the advantages and disadvantages of the camera configuration mode can be identified, according to the relative position relationship between each two adjacent visible cameras. The relative cost value of each camera configuration mode can be calculated, according to the relative position relationship between each two adjacent visible cameras of each test point in each camera configuration mode. The relative cost value identifies the impact of the relative position relationship between each two adjacent visible cameras of each test point on each configuration cost value. For example, if an angle between two adjacent visible cameras is within a certain range, the relative cost value is small. If the angle between two adjacent visible cameras exceeds the certain range, the relative cost value is large. The angle between adjacent visible cameras refers to a relative angle formed by connection lines between the two adjacent visible cameras and the test point.

At S1003, the configuration cost value of each camera configuration mode is calculated based on the relative cost value, and the final camera configuration mode is determined according to the configuration cost value.

In some embodiments, when calculating the configuration cost value of each camera configuration mode based on the relative cost value, the relative cost value can be directly used as the configuration cost value of each camera configuration mode. That is, when calculating the configuration cost value of each camera configuration mode based on the relative cost value, only the impact of the relative position relationship between each two adjacent visible cameras of each test point on the configuration cost value is considered. In some embodiments, when calculating the configuration cost value, the relative cost value can be used as a part of the configuration cost value. That is, when calculating the configuration cost value, other factors that affect the configuration cost value can also be considered.

For example, in addition to the impact of the relative position relationship between each two adjacent visible cameras of each test point, the impact of the number of visible cameras of each test point on the configuration cost value can also be considered. That is, when calculating the configuration cost value, the impact of the relative position relationship between each two adjacent visible cameras and the number of visible cameras of each test point on the configuration cost value can be considered. In this situation, the configuration cost value can include two parts, i.e., the relative cost value corresponding to the relative position relationship between each two adjacent visible cameras and the visible cost value corresponding to the number of visible cameras of each test point. The relative cost value and the visible cost value can be summed to obtain the configuration cost value. It can be appreciated that the visible cost value corresponding to the number of visible cameras of each test point can be calculated, before calculating the configuration cost value. The visible cost value identifies the impact of the number of visible cameras of each test point on the configuration cost value. The process of calculating the visible cost value is same as the process at S104 and the detailed description thereof is omitted.

For example, the visible cost value of each test point can be calculated, according to the number of visible cameras of each test point, and the visible cost values for all test points can be accumulated to obtain a total visible cost value k1 (i.e., the visible cost value of each camera configuration mode). The relative cost value of each test point can be calculated, according to the relative position relationship between each two adjacent visible cameras of each test point, and the relative cost value for all test points can be accumulated to obtain a total relative cost value K2 (i.e., the relative cost value of each camera configuration mode). The total visible cost value k1 and the total relative cost value K2 can be summed to obtain the configuration cost value of the corresponding camera configuration mode. The configuration cost value of each camera configuration mode can be calculated in the same way. The final camera configuration mode can be determined according to the configuration cost value of each camera configuration mode and the cameras can be configured according to the determined final camera configuration mode. Generally, the determination principle is that a lower configuration cost value corresponds to a better camera configuration mode.

The Seventh Embodiment

Figure 11:
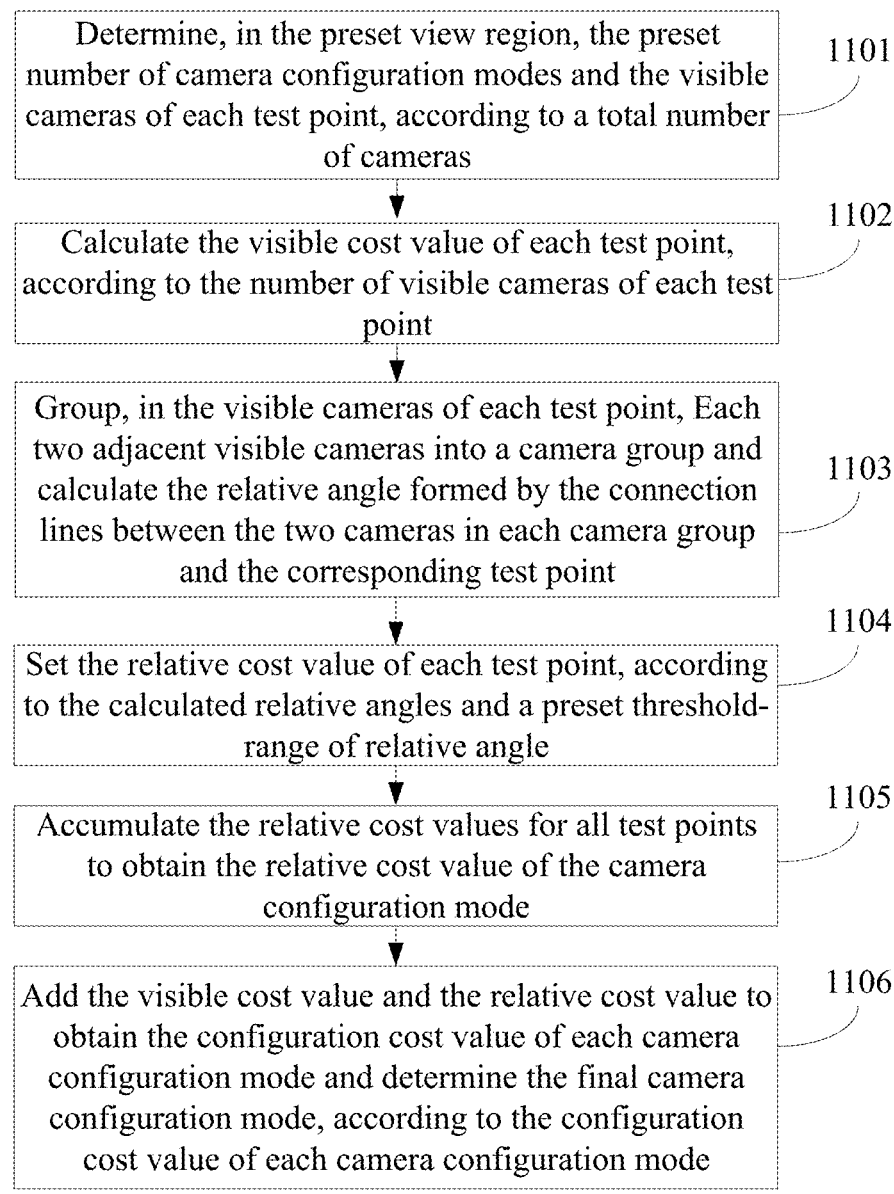
FIG. 11 is a flowchart of a camera configuration method according to a seventh embodiment of the present disclosure.

FIG. 11 is a flowchart of another camera configuration method consistent with the disclosure. The executing entity may be a computer device or a functional unit in the computer device. On the basis of the sixth embodiment, the relative cost value is calculated, according to the relative angle formed by connection lines between each two adjacent visible cameras and the test point.

As shown in FIG. 11, at S1101, in the preset view region, determining the preset number of camera configuration modes and the visible cameras of each test point, according to the total number of cameras.

The process at S1101 is same as the process at S1001, and the detail description thereof is omitted here.

At S1102, the visible cost value of each test point is calculated, according to the number of visible cameras of each test point.

For example, the visible cost value of each test point can be calculated, according to the number of visible cameras of each test point, and the visible cost values for all test points can be accumulated to obtain the total visible cost value (i.e., the visible cost value of each camera configuration mode).

At S1103, in the visible cameras of each test point, each two adjacent visible cameras are grouped into a camera group and the relative angle formed by the connection lines between the two cameras in each camera group and the corresponding test point is calculated.

Figure 12:
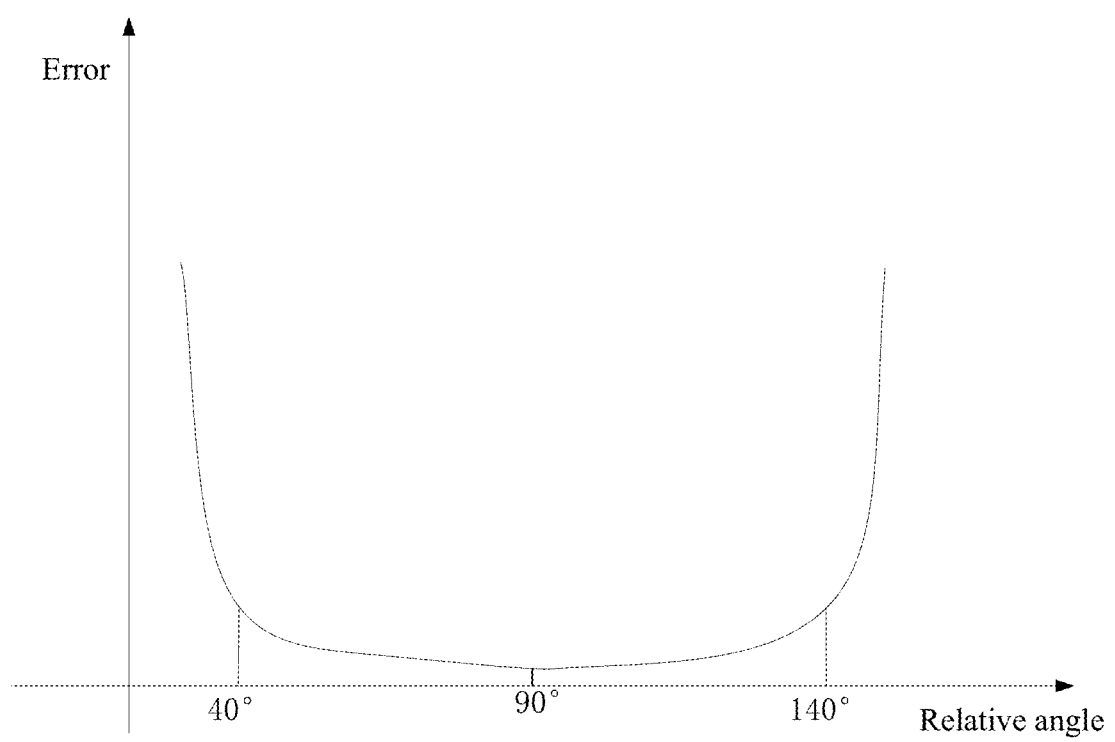
FIG. 12 schematically shows an impact of a relative angle of two adjacent visible cameras on a positioning accuracy of a test point.

In the visible cameras of a same test point, the relative angle formed by the connection lines between the two adjacent cameras and the test point (also referred to as a relative angle of two adjacent cameras) can affect the positioning accuracy of the test point. FIG. 12 schematically shows an impact of the relative angle of two adjacent visible cameras on the positioning accuracy of the test point. In some embodiments, when the relative angle of two adjacent visible cameras is 90°, the positioning accuracy of the test point is optimum. When the relative angle of two adjacent visible cameras is less than 40° or greater than 140°, the error of the positioning accuracy of the test point is great. Therefore, when calculating the configuration cost value, the impact of the relative angle of two adjacent visible cameras on the positioning accuracy of the test point needs to be considered. Thus, the relative angle of each two adjacent visible cameras can be calculated after determining the number of visible cameras of each test point.

Figure 13:
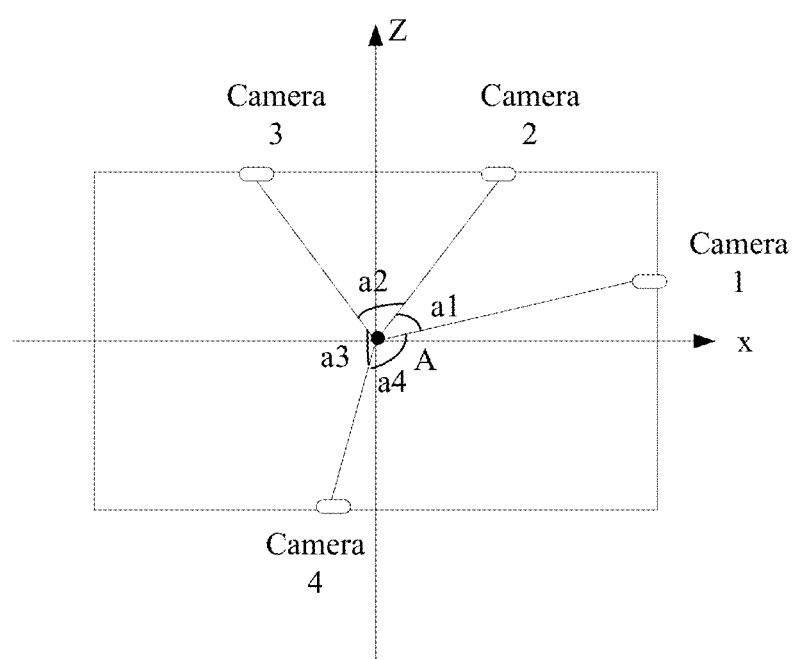
FIG. 13 schematically shows grouping adjacent cameras into camera groups.

Camera groups can be formed by grouping two adjacent visible cameras (in clockwise or counterclockwise sequence) and a total number of camera groups of the visible cameras can be calculated. The relative angle formed by the connection lines between the two cameras in each camera group and the test point can be calculated. FIG. 13 schematically shows grouping the adjacent cameras into the camera groups. For example, as shown in FIG. 13, assume that the test point A has four visible cameras, i.e., the test point A can be seen by cameras 1, 2, 3, and 4. Two adjacent visible cameras are grouped into the camera groups (in clockwise or counterclockwise sequence). For example, the camera 1 and the camera 2 are grouped into a camera group A, the camera 2 and the camera 3 are grouped into a camera group B, the camera 3 and the camera 4 are grouped into a camera group C, and the camera 4 and the camera 1 are grouped into a camera group D. The relative angle formed by the connection lines between the two cameras in each camera group can be calculated. For example, the relative angle of the camera group A is a1, the relative angle of the camera group B is a2, the relative angle of the camera group C is a3, and the relative angle of the camera group D is a4.

At S1104, the relative cost value of each test point is set, according to the calculated relative angle of each camera group and a preset threshold-range of relative angle.

At S1105, the relative cost values for all test points is accumulated to obtain the relative cost value of the camera configuration mode.

In some embodiments, the preset threshold-range of relative angle can be [40°, 140°]. There are two manners to set the relative cost value of each test point, according to the calculated relative angle of each camera group and the preset threshold-range of relative angle.

The first manner is as follows. The total number of camera groups of the visible cameras of each test point can be calculated. The number of camera groups whose relative angles exceed the preset threshold-range of relative angle can be counted. A ratio of the number of camera groups whose relative angles exceed the preset threshold-range of relative angle to the total number of camera groups can be calculated. The relative cost value of each test point can be set according to the ratio. For example, after calculating the relative angle a1, the relative angle a2, the relative angle a3, and the relative angle a4, whether the relative angle a1, the relative angle a2, the relative angle a3, and the relative angle a4 are within the preset threshold-range of relative angle can be determined. The ratio of the number of camera groups whose relative angles exceed the preset threshold-range of relative angle to the total number of camera groups can be calculated and the relative cost value of each test point can be set as one of several levels according to the ratio. The principle of setting the relative cost value based on the ratio is that a small ratio corresponds to a small relative cost value and a large ratio corresponds to a large relative cost value.

For example, the total number of camera groups is determined to be 4. If the ratio of the number of camera groups exceeding the preset threshold-range of relative angle to the total number of camera groups is 1/4, there are three camera groups having the relative angle within the preset threshold-range of relative angle, which corresponds to a better camera positioning effect, and the relative cost value can be set as 10. If the ratio is 2/4, there are two camera groups having the relative angle within the preset threshold-range of relative angle, which corresponds to a normal camera positioning effect, and the relative cost value can be set as 40. If the ratio is 3/4, there is only one camera group having the relative angle within the preset threshold-range of relative angle, which corresponds to a poor camera positioning effect, and the relative cost value can be set as 80. If the ratio is 1, there is no camera group having the relative angle within the preset threshold-range, which corresponds to a worst camera positioning effect, and the relative cost value can be set as 150.

The second manner is as follows. Whether the calculated relative angle exceeds the preset threshold-range of relative angle can be determined. If the calculated relative angle exceeds the preset threshold-range of relative angle, a group cost value of the corresponding camera group can be increased, otherwise, the group cost value of the corresponding camera group can be decreased or remain unchanged. The group cost value for all camera groups can be accumulated to obtain the relative cost value of the corresponding test point. Because the objective is to find a small configuration cost value, reducing the group cost value of the camera group to reduce the relative cost value of the test point means that the corresponding camera configuration mode is considered to be a better configuration mode.

For example, after calculating the relative angle a1, the relative angle a2, the relative angle a3, and the relative angle a4, whether the relative angle a1, the relative angle a2, the relative angle a3, and the relative angle a4 are within the preset threshold-range of relative angle can be determined. If the relative angle exceeds the preset threshold-range of relative angle, the group cost value of the corresponding camera group can be increased based on a preset standard value. If the relative angle is within the preset threshold-range of relative angle, the group cost value of the corresponding camera group can be decreased based on the preset standard value. The group cost value for all camera groups can be accumulated to obtain the relative cost value of the corresponding test point. For example, assume that the preset standard value is 80. If the relative angle a1 is within the preset threshold-range of relative angle, the group cost value of the camera group A can be set as 50. If the relative angle a2 exceeds the preset threshold-range of relative angle, the group cost value of the camera group B can be set as 100. After obtaining all the group cost values, the group cost value of the camera group A, the group cost value of the camera group B, the group cost value of the camera group C, and the group cost value of the camera group D can be accumulated to obtain the relative cost value of the test point A. Similarly, the relative cost values for other test points in the preset view region can be obtained. The relative cost values for all test points can be accumulated to obtain the relative cost value of the camera configuration mode.

At S1106, the visible cost value and the relative cost value are summed to obtain the configuration cost value of each camera configuration mode and the final camera configuration mode is determined, according to the configuration cost value of each camera configuration mode.

The relative cost value can be obtained according to the relative position relationship between each two adjacent visible cameras of each test point. The visible cost value can be obtained according to the number of visible cameras of each test point. The relative cost values for all test points and the relative cost values for all test points can be summed to obtain the configuration cost value of the camera configuration mode. The final camera configuration mode can be determined, according to the configuration cost value of each camera configuration mode. The cameras can be configured according to the final camera configuration mode. Generally, the determination principle is that a small configuration cost value corresponds to a better camera configuration mode.

The Eighth Embodiment

Figure 14:
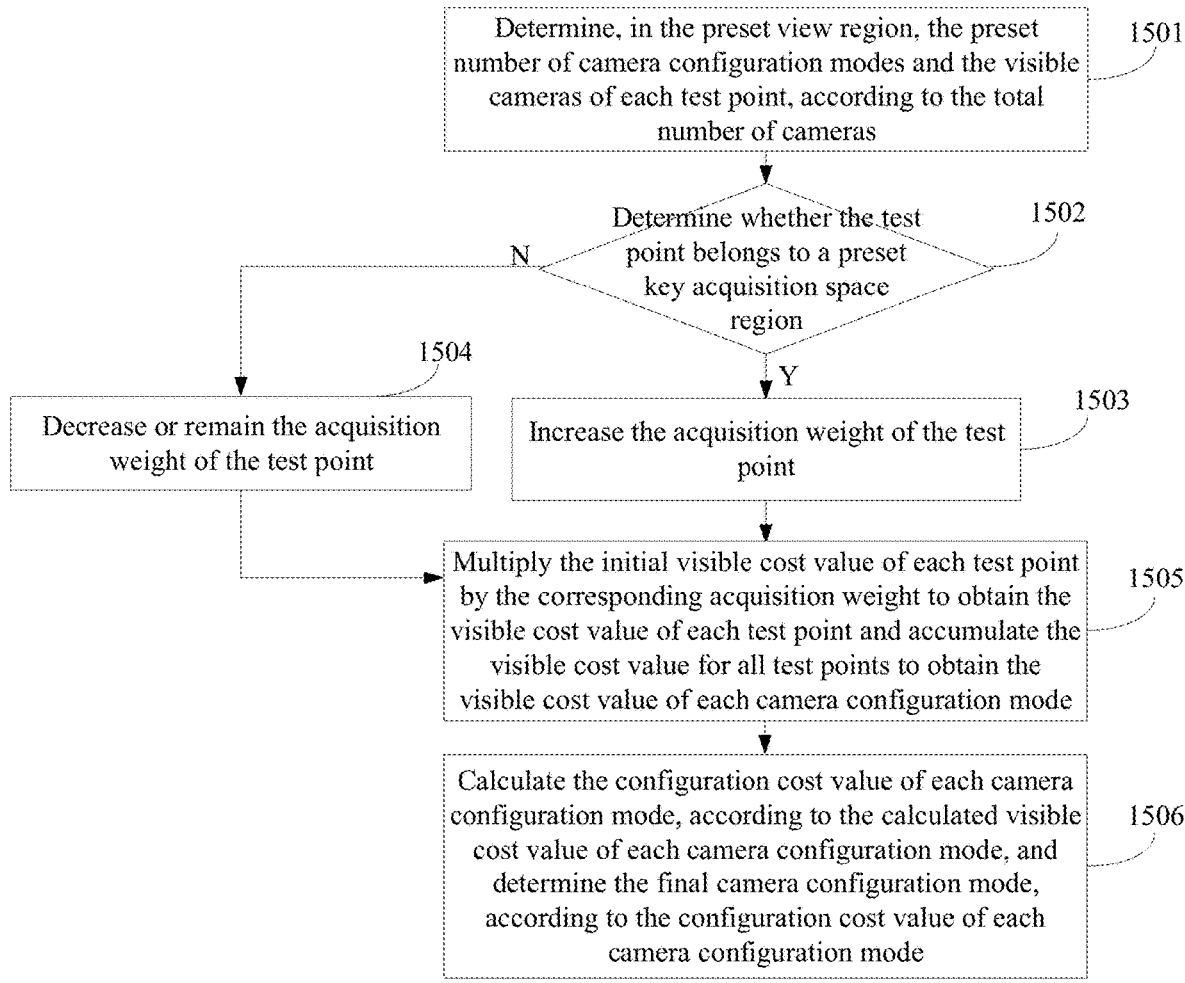
FIG. 14 is a flowchart of a camera configuration method according to an eighth embodiment of the present disclosure.

FIG. 14 is a flowchart of another camera configuration method consistent with the disclosure. Position information of each test point in the view region is considered, when calculating the configuration cost value.

As shown in FIG. 14, at S1501, in the preset view region, determining the preset number of camera configuration modes and the visible cameras of each test point, according to the total number of cameras.

The process at S1501 is same as the process at S1101, and the detailed description thereof is omitted here.

At S1502, whether the test point belongs to a preset key acquisition space region is determined. If belongs, proceed the process at S1503, otherwise, proceed the process at S1504.

The key acquisition space region can be set according to the actual needs. For example, the acquisition region corresponding to a game path can be set as the key acquisition space region.

At S1503, when setting the acquisition weight, the acquisition weight of the test point is increased.

At S1504, when setting the acquisition weight, the acquisition weight of the test point is decreased or remains unchanged.

When setting the acquisition weight, the impact of specific position information of the test point in the acquisition region on the configuration cost value can also be considered for a specific application scenario. When calculating the configuration cost value, different acquisition weights can be assigned to the test points at different positions. Generally, if the test point belongs to the key acquisition space region, it means that the test point belongs to the key observation region and the acquisition weight can be set as a large value. If the test point does not belong to the key acquisition space region, the acquisition weight can be set as a small value.

The key acquisition space region may be different for different application scenarios. Therefore, when calculating the configuration cost value, the impact of the position information of the test point on the configuration cost value can also be considered. For example, whether the test point belongs to the preset key acquisition space region can be determined. If the test point belongs to the preset key acquisition space region, the acquisition weight of the test point can be increased base on a preset standard value. If the test point does not belong to the preset key acquisition space region, the acquisition weight of the test point can be decreased base on the preset standard value or remain to be the preset standard value.

At S1505, the initial visible cost value of each test point is multiplied by the corresponding acquisition weight to obtain the visible cost value of each test point and the visible cost value for all test points are accumulated to obtain the visible cost value of each camera configuration mode.

At S1506, the configuration cost value of each camera configuration mode is calculated, according to the calculated visible cost value of each camera configuration mode, and the final camera configuration mode is determined, according to the configuration cost value of each camera configuration mode.

The initial visible cost value of each test point refers to a visible cost value calculated according to each camera configuration mode without considering the acquisition weight. The initial visible cost value of each test point is multiplied by the acquisition weight of each test point to obtain the visible cost value of each test point. The visible cost value for all test point can be accumulated to obtain the visible cost value of each camera configuration mode. In some embodiments, when calculating the configuration cost value of each camera configuration mode, the calculated visible cost value of the camera configuration mode can be taken as the configuration cost value or a part of the configuration cost value. In some embodiments, when calculating the configuration cost value, the impact of a position of an intersection between a view axis of each camera and a horizontal plane on the configuration cost value can also be considered. The impact can be identified by an intersection cost value. When calculating the configuration cost value, the intersection cost value and the visible cost value can be summed to obtain the configuration cost value.

The Ninth Embodiment

Figure 15:
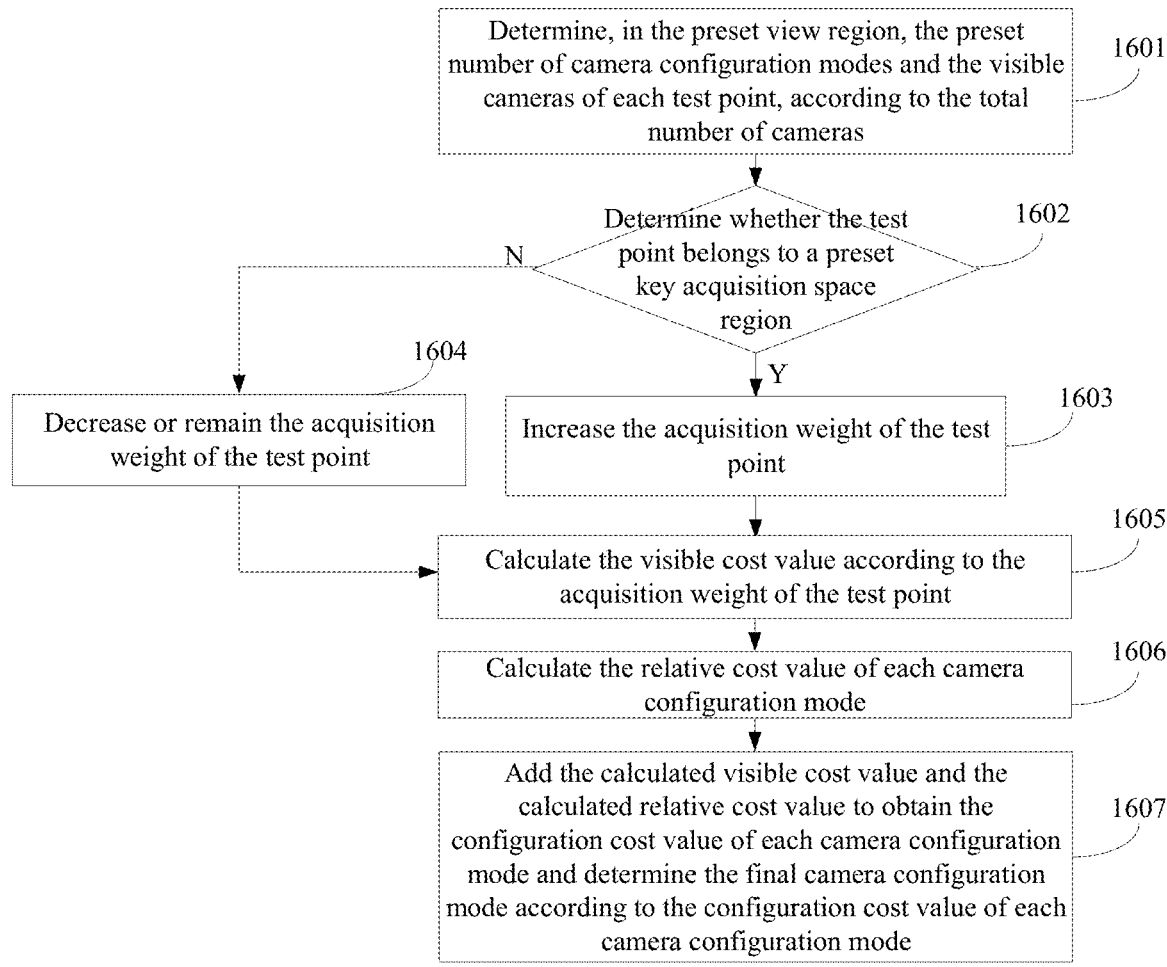
FIG. 15 is a flowchart of a camera configuration method according to a ninth embodiment of the present disclosure.

FIG. 15 is a flowchart of another camera configuration method consistent with the disclosure. On the basis of the ninth embodiment, the relative cost value is also considered. That is, when calculating the configuration cost value, the number of visible cameras of each test point, the relative position relationship between each two adjacent visible cameras of each test point, and whether or not each test point belongs to the key acquisition space region can be considered together.

As shown in FIG. 15, the processes at S1601 to S1605 are same as the processes at S1501 to S1505, and the detailed description thereof is omitted here.

At S1606, the initial relative cost value of each test point is multiplied by the acquisition weight of the corresponding test point to obtain the relative cost value of each test point. The relative cost value for all test points are accumulated to obtain the relative cost value of each camera configuration mode.

The relative cost value of each test point obtained by multiplying the initial relative cost value of each test point by the corresponding test point can be also referred to as a weighted relative cost value of each test point.

At S1607, the calculated visible cost value and the calculated relative cost value are summed to obtain the configuration cost value of each camera configuration mode and the final camera configuration mode is determined according to the configuration cost value of each camera configuration mode.

For example, the initial visible cost value K01 corresponding to the test point can be calculated, according to the number of visible cameras of the test point. The initial visible cost value K01 can be multiplied by K3 to obtain the visible cost value K11 of the test point. After calculating the visible cost value of each test point in a similar manner, the visible cost value for all test points can be accumulated to obtain the total visible cost value k1 of all test points (i.e., the visible cost value of the corresponding camera configuration mode). The initial relative cost value K04 of the test point can be calculated, according to the relative position relationship between each two adjacent visible cameras of the test point. The initial relative cost value K04 can be multiplied by K3 to obtain the relative cost value K41 of the test point. After calculating the relative cost value of each test point in a similar manner, the relative cost value for all test points can be accumulated to obtain the total relative cost value of all test points (i.e., the relative cost value of the corresponding camera configuration mode). The total visible cost value k1 and the total relative cost value K5 can be summed to obtain the configuration cost value of the corresponding camera configuration mode. The configuration cost value of each camera configuration mode can be calculated in a similar manner. The final camera configuration mode can be determined, according to the calculated configuration cost value of each camera configuration mode, and the cameras can be configured according to the determined camera configuration mode. Generally, the determination rule is a small configuration cost value corresponds to a better camera configuration mode.

The Tenth Embodiment

Figure 16:
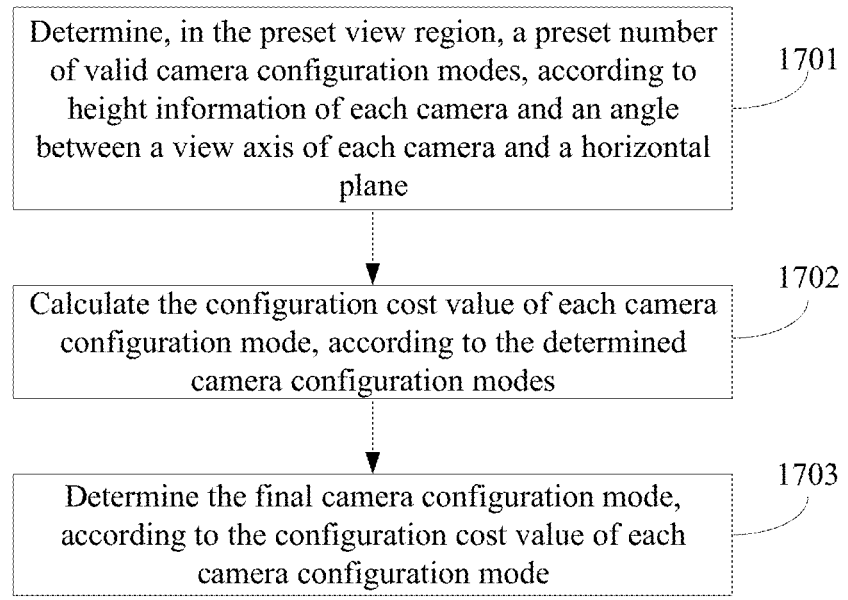
FIG. 16 is a flowchart of a camera configuration method according to a tenth embodiment of the present disclosure.

FIG. 16 is a flowchart of another camera configuration method consistent with the disclosure. The executing entity may be a computer device or a functional unit in the computer device.

As shown in FIG. 16, at S1701, in the preset view region, a preset number of valid camera configuration modes is determined, according to height information of each camera and an angle between a view axis of each camera and a horizontal plane.

The preset view region may be a simulation region of any size that is created by the user in an optical motion capture system, and the simulation region may include obstacles, such as columns and walls. In the preset view region, the user can further set the camera parameters, including the number of cameras or the like. The number of cameras can be set according to the actual needs.

The camera configuration modes can be determined by the camera parameters set by the user. The possible arrangement position and angle of each camera can be calculated according to the camera parameters. The different calculation results can be combined to determine the preset number of camera configuration modes. The preset number of camera configuration modes can include all possible combinations, or some combinations, according to the application scenario, which, specifically, can be set according to the need of the actual application. It is not intended to limit the preset number of camera configuration modes here.

Because the possible arrangement position of each camera can be calculated and different positions of each camera correspond to different capture effects, the height information of each camera and the angle between the view axis of each camera and the horizontal plane need to be considered when determining the camera configuration modes.

In conventional technologies, when calculating the possible arrangement position of each camera according to the camera parameters, the height information of each camera is fixed and only the position and direction of each camera in the horizontal plane are considered. However, this manner limits the number of camera configuration modes, and it may be harmful for the action capture in some application scenarios (e.g., full-body motion capture). In extreme situations, a certain camera cannot capture images of the view region. To avoid situations where the camera cannot capture images of the view region, the height information of each camera and the angle between the view axis of each camera and the horizontal plane need to be considered when determining the camera configuration modes.

In some embodiments, if a camera in a camera configuration mode cannot capture images of the visible region, the camera configuration mode is determined to be an invalid camera configuration mode. If each camera in a camera configuration mode can capture images of the visible region, the camera configuration mode is determined to be a valid camera configuration mode. In some embodiments, whether the camera configuration mode is valid can be identified by the height information of each camera and the angle between the view axis of each camera and the horizontal plane. When the camera configuration mode is generated, the preset number of valid camera configuration modes can be determined by constraining the height information of each camera and the angle between the view axis of each camera and the horizontal plane. For example, if the height information of each camera and the angle between the view axis of each camera and the horizontal plane are within certain ranges, the corresponding camera configuration mode can be determined to be valid. If the height information of each camera and the angle between the view axis of each camera and the horizontal plane exceed certain ranges, the corresponding camera configuration mode can be determined to be invalid.

The view region can be set as a shape of quadrangle or rectangle, and hence the view region generally exhibits a symmetry feature. In this situation, the user only needs to set position information of one camera to generate position information of four or eight cameras, thereby reducing the input amount of camera parameters for the user and improving the efficiency of calculating the preset number of camera configuration modes.

The test points can include the markers. The markers can include special markers or light-emitting points and can be affixed to the target object being captured. The optical motion capture system can realize the motion capture by recognizing the markers and processing the markers data. In some embodiments, the preset number of test points may be set in the preset view region. The preset number can be customized according to the application requirements. A larger preset number corresponds to more test points and a longer test time, but the test results can be more accurate.

At S1702, the configuration cost value of each camera configuration mode is calculated, according to the determined camera configuration modes.

Hereafter, the camera configuration modes refer to the valid camera configuration modes determined according to the height information of each camera and the angle between the view axis of the camera and the horizontal plane.

In the process at S1702, when calculating the configuration cost value of each camera configuration mode according to the determined camera configuration modes, one or more factors that affects the camera configuration mode can be considered.

In some embodiments, when calculating the configuration cost value of each camera configuration mode, the impact of the relative position relationship between each two adjacent visible cameras of each test point on the capture effect can be considered. For example, the relative cost value of each camera configuration mode is calculated, according to the relative position relationship between each two adjacent visible cameras of each test point in each camera configuration mode.

When calculating the configuration cost value of each camera configuration mode based on the relative cost value, the relative cost value may be directly used as the configuration cost value of each camera configuration mode. That is, when calculating the configuration cost value of each camera configuration mode, only the impact of the relative position relationship between each two adjacent visible cameras of each test point on the configuration cost value is considered.

The processes of calculating the relative cost value are similar to the processes at S1104 and S1105, and the detailed description thereof is omitted here.

In some embodiments, when calculating the configuration cost value of each camera configuration mode based on the relative cost value, the relative cost value may be used as a part of the configuration cost value of each camera configuration mode. That is, when calculating the configuration cost value, other factors that affect the configuration cost value can also be considered.

In some embodiments, when calculating the configuration cost value, in addition to the impact of the relative position relationship between each two adjacent visible cameras of each test point, the impact of the number of visible cameras of each test point on the configuration cost value can also be considered. That is, when calculating the configuration cost value, the impact of the relative position relationship between each two adjacent visible cameras and the number of visible cameras of each test point on the configuration cost value can be considered together. In this situation, the configuration cost value can include two parts, i.e., the relative cost value corresponding to the relative position relationship between each two adjacent visible cameras and the visible cost value corresponding to the number of visible cameras of each test point. The relative cost value and the visible cost value can be summed to obtain the configuration cost value. It can be appreciated that the visible cost value corresponding to the number of visible cameras of each test point can be calculated, before calculating the configuration cost value. The visible cost value identifies the impact of the number of visible cameras of each test point on the configuration cost value.

For example, the visible cost value of each test point can be calculated, according to the number of visible cameras of each test point, and the visible cost values for all test points can be accumulated to obtain the total visible cost value $k1$ (i.e., the visible cost value of each camera configuration mode). The relative cost value of each test point can be calculated, according to the relative position relationship between each two adjacent visible cameras of each test point, and the relative cost value for all test points can be accumulated to obtain the total relative cost value K2 (i.e., the relative cost value of each camera configuration mode). The total visible cost value k1 and the total relative cost value K2 can be summed to obtain the configuration cost value of the corresponding camera configuration mode. The configuration cost value of each camera configuration mode can be calculated in the same way.

At S1703, the final camera configuration mode is determined according to the configuration cost value of each camera configuration mode.

The final camera configuration mode can be determined according to the configuration cost value of each camera configuration mode calculated at S1702 and the cameras can be configured according to the determined final camera configuration mode. Generally, the determination rule is that a small configuration cost value corresponds to a better camera configuration mode.

The Eleventh Embodiment

Figure 17:
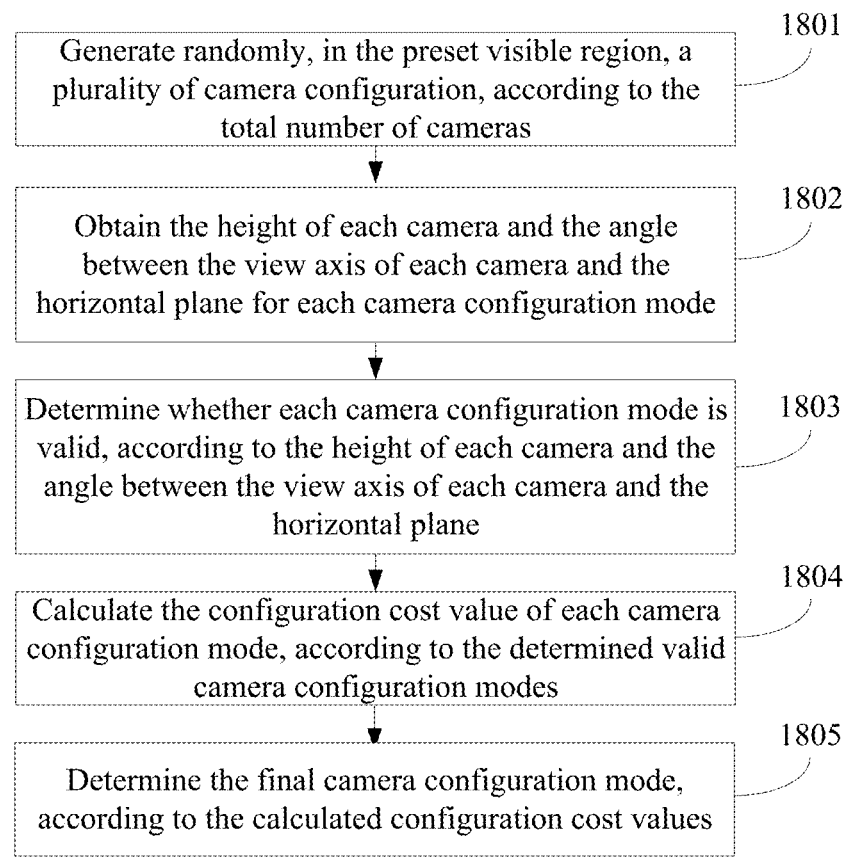
FIG. 17 is a flowchart of a camera configuration method according to an eleventh embodiment of the present disclosure.

FIG. 17 is a flowchart of another camera configuration method consistent with the disclosure. The executing entity may be a computer device or a functional unit in the computer device. On the basis of the eleventh embodiment, how to determine the preset number of valid camera configuration modes according to height information of each camera and the angle between the view axis of each camera and the horizontal plane will be described in detail below.

As shown in FIG. 17, at S1801, in the preset visible region, a plurality of camera configuration modes are randomly generated, according to the total number of cameras.

The preset view region may be a simulation region of any size that is created by the user in an optical motion capture system, and the simulation region may include obstacles, such as columns and walls. In the preset view region, the user can further set the camera parameters, including the number of cameras or the like. The number of cameras can be set according to the actual needs.

The camera configuration modes can be determined by the camera parameters set by the user. The possible arrangement position and angle of each camera can be randomly calculated according to the camera parameters. In conventional technologies, when calculating the possible arrangement position of each camera according to the camera parameters, the height information of each camera is fixed and only the position and direction of each camera in the horizontal plane are considered. However, this manner limits the number of camera configuration modes, and it may be harmful for the action capture in some application scenarios (e.g., full-body motion capture). In extreme situations, a certain camera cannot capture images of the view region. In the present embodiment, after the camera configuration modes have been generated according to the conventional technologies, the preset number of valid camera configuration modes can be determined by constraining the height information of each camera and the angle between the view axis of each camera and the horizontal plane.

At S1802, the height of each camera and the angle between the view axis of each camera and the horizontal plane are obtained for each camera configuration mode.

The height of each camera can be obtained for each randomly generated camera configuration mode. The angle between the view axis of each camera and the horizontal plane can also be obtained for each randomly generated camera configuration mode. The objective is to further determine whether each randomly generated camera configuration mode is the valid camera configuration mode.

At 1803, whether each camera configuration mode is valid is determined, according to the height of each camera and the angle between the view axis of each camera and the horizontal plane.

If each camera of a camera configuration mode meets one of the following criteria, the camera configuration mode can be determined to be valid.

1) The height of the camera is greater than a preset first threshold and the angle between the view axis of the camera and the horizontal plane is less than a preset first angle.

2) The height of the camera is less than a preset second threshold and the angle between the view axis of the camera and the horizontal plane is greater than a preset second angle.

3) The height of the camera is within a preset third threshold range and the angle between the view axis of the camera and the horizontal plane is within a preset third angle range.

The first threshold, the first angle, the second threshold, the second angle, the third threshold range, and the third angle range can be adjusted according to the actual needs.

In the view region, the horizontal plan is defined as a XZ plan formed by an X-axis and a Z-axis. Therefore, Y-axis information (height) of each camera and the angle information between the view axis of each camera and the XZ plan (horizontal plane) can be combined to determine whether the camera configuration mode is valid.

For example, if the Y-axis height of the camera in the view region is greater than the preset first threshold (i.e., the arrangement position of the camera is close to a highest value of the view region), and if the lens of the camera is facing upward, the camera cannot capture the images of the view region. Therefore, the angle between the view axis of each camera and the XZ plan (horizontal plane) needs to be constrained (i.e., the angle between the view axis of the camera and the horizontal plane is less than the preset first angle), such that the lens of the camera that is close to the highest value is facing as downward as possible to ensure that the camera can capture the images of the view region. For example, assume that the view angle of the camera is A, and the preset first angle can set as A/2.

As another example, if the Y-axis height of the camera in the view region is less than the preset second threshold (i.e., the arrangement position of the camera is close to a lowest value of the view region), and if the lens of the camera is facing downward, the camera cannot capture the images of the view region. Therefore, the angle between the view axis of each camera and the XZ plan (horizontal plane) needs to be constrained (i.e., the angle between the view axis of the camera and the horizontal plane is greater than the preset first angle), such that the lens of the camera that is close to the lowest value is facing as upward as possible to ensure that the camera can capture the images of the view region. For example, assume that the view angle of the camera is A, and the preset first angle can set as A/2.

As another example, if the Y-axis height of the camera in the view region is within the preset third threshold range (i.e., the arrangement position of the camera is close to a middle area of the view region and a specific value of the third threshold range can be determined according to the specific application), and the direction that the lens of the camera is facing needs to be set according to the specific capture requirements (i.e., the angle between the view axis of the camera and the horizontal plane is within the preset third angle range, and the lens of the camera may be facing upward, downward, or forward), such that the angle between the view axis of the camera and the horizontal plane needs to be constrained to ensure that the camera can capture the images of the view region.

At S1804, the configuration cost value of each camera configuration mode is calculated, according to the determined valid camera configuration modes.

The process at S1804 is same as the process at S1702 and the detailed description thereof is omitted here.

At S1805, the final camera configuration mode is determined according to the calculated configuration cost values.

The final camera configuration mode can be determined, according to the calculated configuration cost value of each camera configuration mode. Generally, a small configuration cost value corresponds to a better camera configuration mode.

The Twelfth Embodiment

Figure 18:
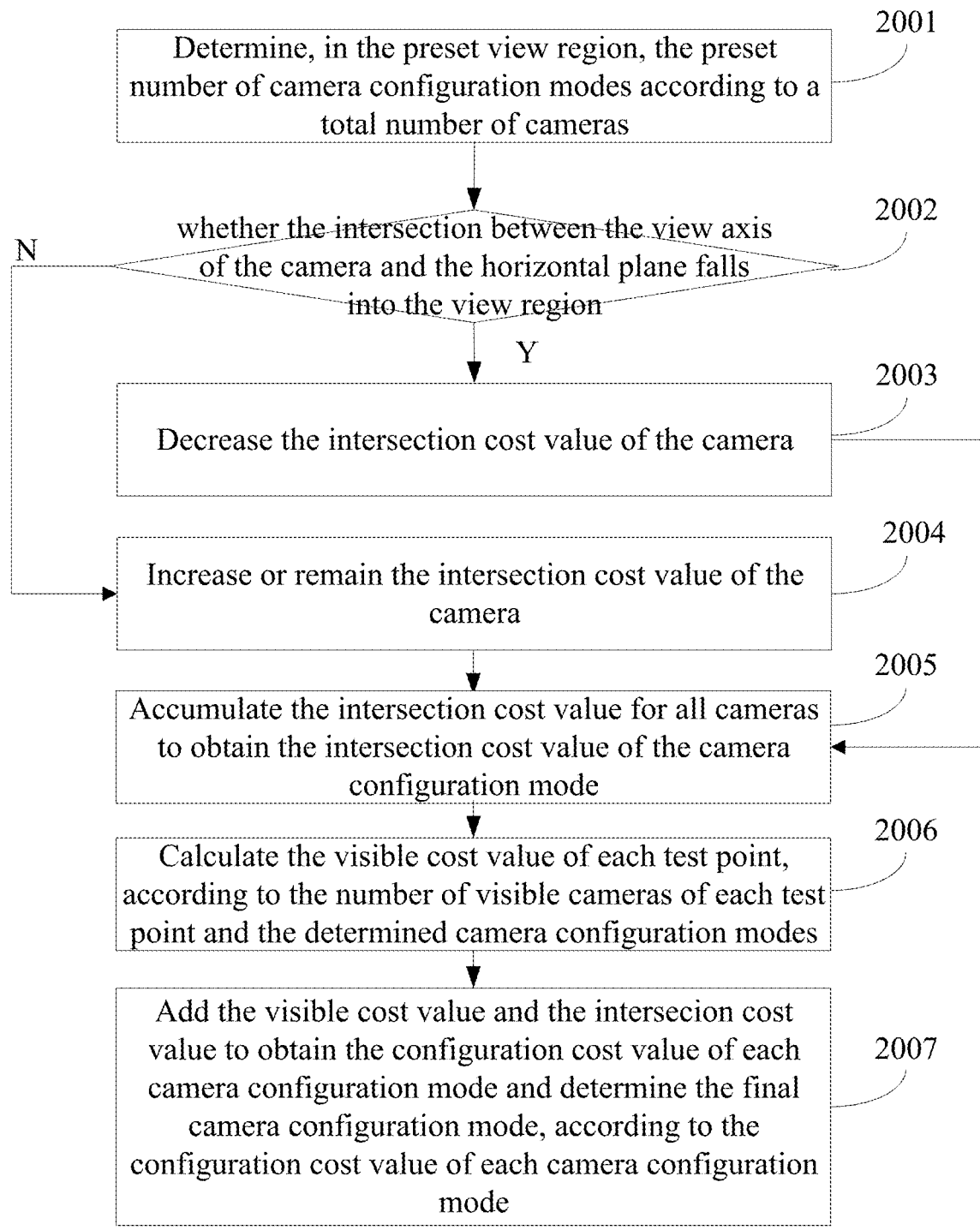
FIG. 18 is a flowchart of a camera configuration method according to a twelfth embodiment of the present disclosure.

FIG. 18 is a flowchart of another camera configuration method consistent with the disclosure. As shown in FIG. 18, at S2001, in the preset view region, determining the preset number of camera configuration modes according to the total number of cameras.

The process at S2001 is same as the process at 1001 and the detailed description thereof is omitted here.

At S2002, whether the intersection between the view axis of the camera and the horizontal plane falls within the view region is determined.

Figure 19:
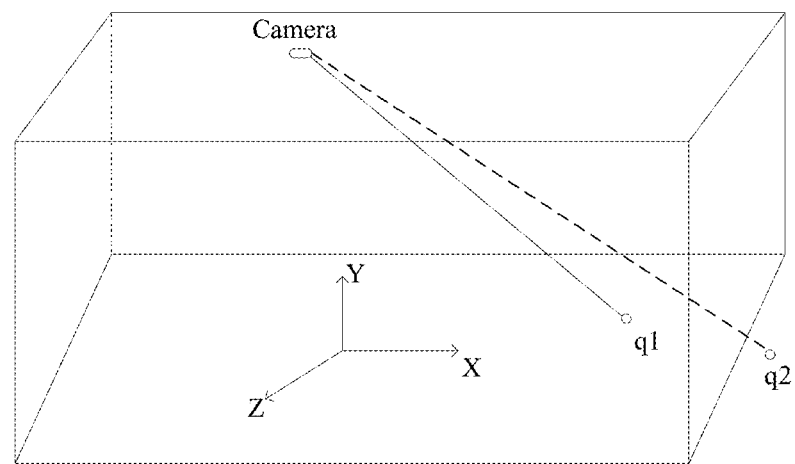
FIG. 19 schematically shows calculating an intersection between a view axis of a camera and a horizontal plane.

FIG. 19 schematically shows calculating the intersection between the view axis of the camera and the horizontal plane. As shown in FIG. 19, x, y, and z form a coordinate system of a single camera. The intersection q between the view axis of the camera (e.g., the normal of the lens of the camera) and the XZ plane can be calculated. The XZ plane is the horizontal plane. Whether the intersection falls within the XZ plane of the preset view region can be determined. As shown in FIG. 19, an intersection q1 falls within the XZ plane of the preset view region and an intersection q2 does not fall within the XZ plane of the preset view region. The intersection q between the view axis of the camera (e.g., the normal of the lens of the camera) and the XZ plane can be affected by the height of the camera, the shooting angle of the camera, or the like.

At S2003, if the intersection between the view axis of the camera and the horizontal plane falls within the view region, the intersection cost value of the camera is decreased and proceed to the process at S2005.

If the intersection q between the view axis of the camera and the XZ plane is in the view region, when calculating the intersection cost value of each camera configuration mode, the intersection cost value of the camera can be decreased on the basis of a preset standard value. Because the objective is to find a small configuration cost value, reducing the intersection cost value of the camera means that the corresponding camera configuration mode is considered to be a better configuration mode.

At S2004, if the intersection between the view axis of the camera and the horizontal plane does not fall within the view region, the intersection cost value of the camera is increased or remain unchanged.

If the intersection q between the view axis of the camera and the XZ plane is not in the view region, when calculating the intersection cost value of each camera configuration mode, the intersection cost value of the camera can be increased on the basis of a preset standard value or remain unchanged. Because the objective is to find a small configuration cost value, increasing the intersection cost value of the camera means that the corresponding camera configuration mode is considered to be a worse configuration mode.

At S2005, the intersection cost value for all cameras is accumulated to obtain the intersection cost value of the camera configuration mode.

After calculating the intersection cost value of each camera, according to the processes at S2002 to S2004, the intersection cost value for all cameras can be accumulated to obtain the intersection cost value of the corresponding camera configuration mode.

At S2006, the visible cost value of each test point is calculated, according to the number of visible cameras of each test point and the determined camera configuration modes.

At S2007, the visible cost value and the intersection cost value are summed to obtain the configuration cost value of each camera configuration mode and the final camera configuration mode is determined, according to the configuration cost value of each camera configuration mode.

For example, the visible cost value of each test point can be calculated, according to the number of visible cameras of each test point, and the visible cost values for all test points can be accumulated to obtain a total visible cost value k1 (i.e., the visible cost value of each camera configuration mode). The intersection cost value of each test point can be calculated, according to the position of the intersection between the view axis of each camera and the horizontal plane, and the intersection cost value for all test points can be accumulated to obtain a total intersection cost value K2 (i.e., the intersection cost value of each camera configuration mode). The total visible cost value k1 and the total intersection cost value K2 can be summed to obtain the configuration cost value of the corresponding camera configuration mode. The configuration cost value of each camera configuration mode can be calculated in the same way. The final camera configuration mode can be determined according to the configuration cost value of each camera configuration mode and the cameras can be configured according to the determined final camera configuration mode. Generally, the determination principle is that a lower configuration cost value corresponds to a better camera configuration mode.

The Thirteenth Embodiment

Figure 20:
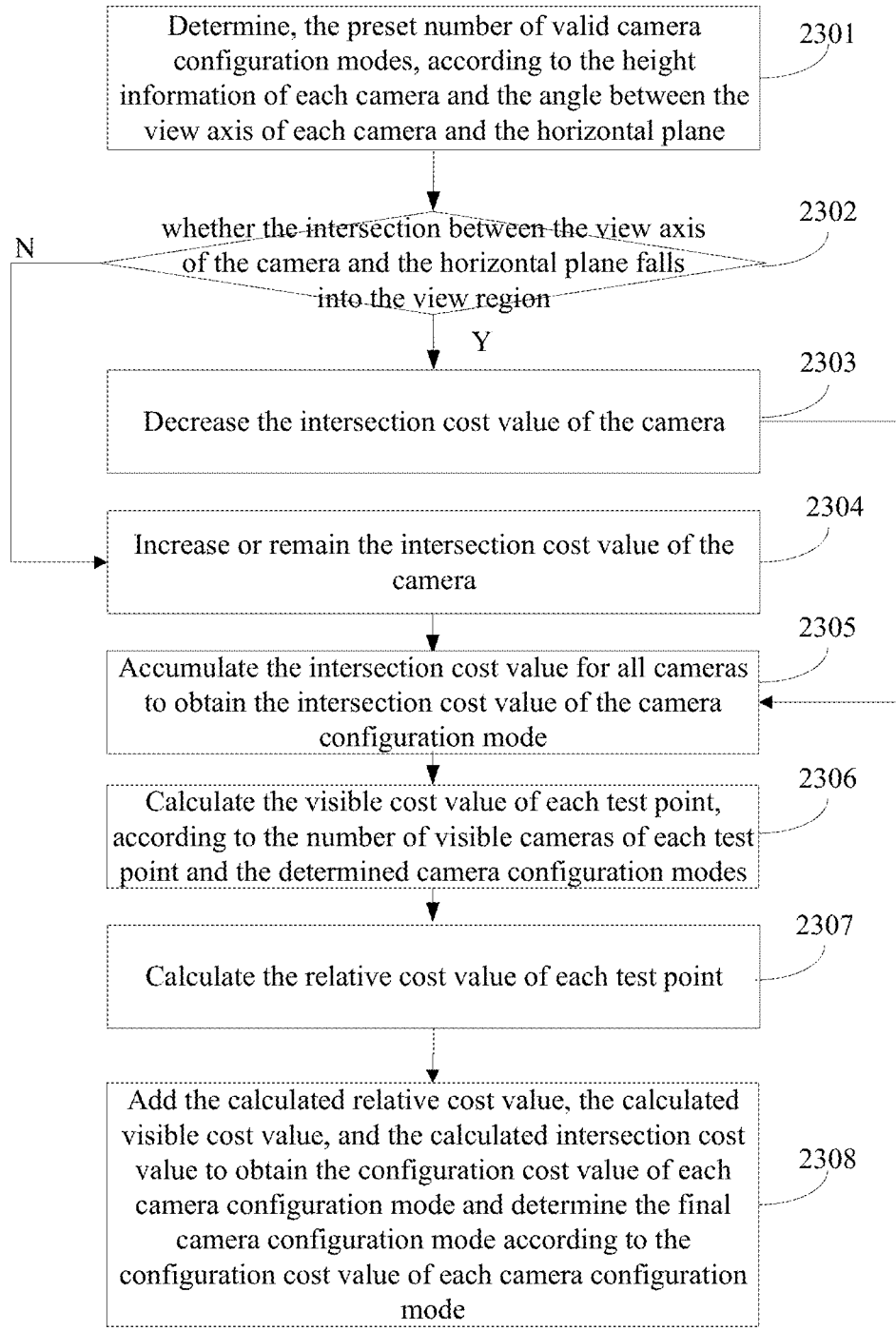
FIG. 20 is a flowchart of a camera configuration method according to a thirteenth embodiment of the present disclosure.

FIG. 20 is a flowchart of another camera configuration method consistent with the disclosure. The plurality of valid camera configuration modes are determined, and the impact of the position of the intersection between the view axis of each camera and the horizontal plane, the number of visible cameras of each test point, and the relative position relationship between two adjacent visible cameras of each test point on the capture effect are considered together here.

As shown in FIG. 20, at S2301, the preset number of valid camera configuration modes is determined, according to the height information of each camera and the angle between the view axis of each camera and the horizontal plane.

The process at S2301 is similar to the processes at S1801 to S1803, and the detailed description thereof is omitted here.

It can be appreciated that after the valid camera configuration modes have been determined, when calculating the configuration cost value of each camera configuration mode in the subsequent processes, the configuration cost value of each valid camera configuration mode is calculated.

The processes at S2302 to S2306 are same as the processes at S2001 to S2006, and the detailed description is thereof omitted.

At S2307, the relative cost value of each camera configuration mode is calculated. The relative cost value identifies the impact of the relative position relationship between each two adjacent visible cameras of each test point on the configuration cost value.

The process at S2307 is similar to the processes at S1103 and S1104, and the detailed description thereof is omitted here.

At S2308, the calculated relative cost value, the calculated visible cost value, and the calculated intersection cost value are summed to obtain the configuration cost value of each camera configuration mode and the final camera configuration mode is determined according to the configuration cost value of each camera configuration mode.

For example, the visible cost value of each test point can be calculated, according to the number of visible cameras of each test point, and the visible cost values for all test points can be accumulated to obtain a total visible cost value $k1$ (i.e., the visible cost value of each camera configuration mode). The relative cost value of each test point can be calculated, according to the relative position relationship between two adjacent visible cameras of each test point, and the relative cost value for all test points can be accumulated to obtain a total relative cost value $K3$ (i.e., the relative cost value of each camera configuration mode). The intersection cost value of each test point can be calculated, according to the position of the intersection between the view axis of each camera and the horizontal plane, and the intersection cost value for all test points can be accumulated to obtain a total intersection cost value $K2$ (i.e., the intersection cost value of each camera configuration mode). The total visible cost value $k1$, the total relative cost value $K3$, and the total intersection cost value $K2$ can be summed to obtain the configuration cost value of the corresponding camera configuration mode. The configuration cost value of each camera configuration mode can be calculated in the same way. The final camera configuration mode can be determined according to the configuration cost value of each camera configuration mode and the cameras can be configured according to the determined final camera configuration mode. Generally, the determination principle is that a lower configuration cost value corresponds to a better camera configuration mode.

In some embodiments, after the valid camera configuration modes are determined, when calculating the configuration cost value of each valid camera configuration mode, whether each test point of each valid camera configuration mode belongs to the preset key acquisition space region can also be considered. That is, when calculating the configuration cost value of each valid camera configuration mode, in addition to the number of visible cameras of each test point, the relative position relationship between two adjacent visible cameras of each test point, and whether the position of the intersection between the view axis of each camera and the horizontal plane falls within the view region, whether each test point belongs to the preset key acquisition space region (corresponding to the acquisition weight) can also be considered.

The Fourteenth Embodiment

In the sixth embodiment to the seventeenth embodiment, the visible cameras of each test point can be obtained according to the following processes.

At S2501, whether the test point belongs to the visible range of the camera is determined.

At S2502, whether a distance between the test point and the camera is within a preset threshold-range is determined. If the distance is within the preset threshold-range, the camera is determined to be the visible camera of the test point, otherwise, the camera is determined not to be the visible camera of the test point.

At S2503, whether a horizontal angle between a measured line of the test point and the view axis of the camera is within a preset angle-threshold-range. If the horizontal angle is within the preset angle-threshold-range, the camera is determined to be the visible camera of the test point, otherwise, the camera is determined not to be the visible camera of the test point.

In some embodiments, the process at S2503 can be omitted. In this situation, only whether the distance between the test point and the camera is within the preset threshold-range needs to be considered. In some embodiments, the process at S2502 can be omitted. In this situation, only whether the horizontal angle between the measured line of the test point and the view axis of the camera is within the preset angle-threshold-range needs to be considered.

As described at S205, if the test point does not satisfy any of the following conditions a1) to a5), it is determined that the test point is within the view range of the camera. If the test point satisfies any of the following conditions a1) to a5), it is determined that the test point is not within the view range of the current camera.

a1) in the user coordinate system established by using the current camera as the reference, the third-dimension coordinate value of the test point is negative.

a2) the distance between the test point and the center point of the lens plane of the current camera is greater than the preset distance threshold.

a3) the horizontal angle between the measured line and the view axis of the lens plane of the current camera is greater than one half of the horizontal-axis field of view of the view range of the current camera, where the measured line is the connection of the test point to the center point of the lens plane of the current camera and the view axis of the lens plan of the current camera is the normal of the lens plan of the current camera.

a4) the longitudinal angle between the measured line and the view axis of the lens plane of the current camera is greater than one half of the longitudinal-axis field of view of the view range of the current camera.

a5) the position of the obstacle in the view region belongs to the line segment formed between the test point and the center point of the lens plane of the current camera.

According to the process at S205, when the test point is determined to belong to the visible range of a current camera, the current camera is determined to belong to the visible cameras of the test point.

In some embodiments, after the test point is determined to belong to the visible range of the camera, the camera is not directly considered to be the visible camera of the test point, but further determination criteria can be summed. In this situation, whether the camera is the visible camera of the test point can be further determined, according to a specific position relationship between the test point and the camera. There are two determination manners as follows.

Figure 21:
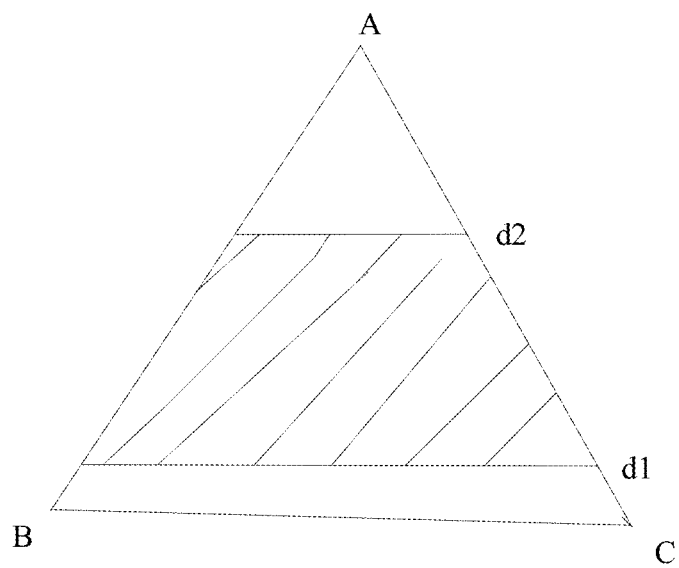
FIGS. 21 to 23 schematically show a visible range of a camera according to a fourteenth embodiment of the present disclosure.

The first determination manner is to determine whether the distance between the test point and the camera, for example, the distance between the test point and the center point of the lens plane of the camera, is within the preset threshold-range. If the distance is within the preset threshold-range, the camera is determined to be the visible camera of the test point, otherwise, the camera is determined not to be the visible camera of the test point. FIG. 21 schematically shows the visible range of the camera consistent with the disclosure. As shown in FIG. 21, the region formed by the triangle ABC denotes the visible range of the camera. Whether the distance between the test point and the center point of the lens plane of the camera is between d2 and d1 is determined. That is, whether the test point is in a trapezoidal region (a slashed region shown in FIG. 21) formed by d2 and d1 is determined. If the test point is in the trapezoidal region, the camera is determined to be the visible camera of the test point.

Figure 22:
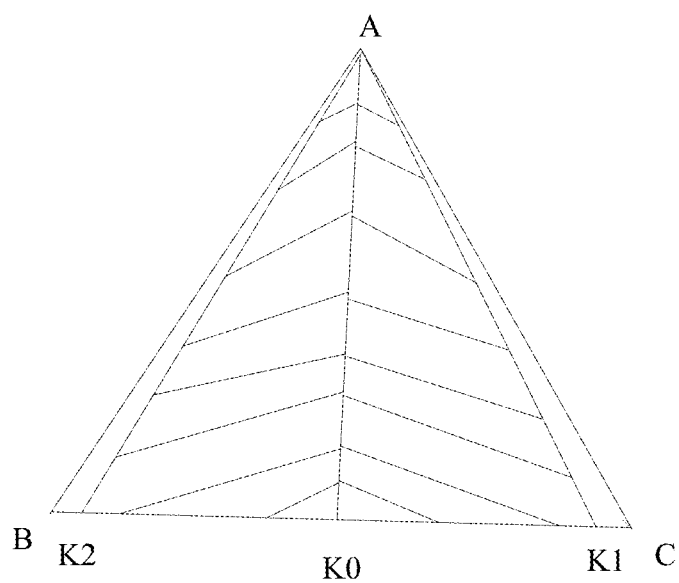

The second determination manner is to determine whether the horizontal angle between the measured line of the test point and the visible axis of the camera is within the preset angle-threshold-range. If the horizontal angle is within the preset angle-threshold-range, the camera is determined to be the visible camera of the test point, otherwise, the camera is determined to not be the visible camera of the test point. FIG. 22 schematically shows the visible range of the camera consistent with the disclosure. As shown in FIG. 22, KO denotes the visible axis of the camera and the region formed by the triangle ABC denotes the visible range of the camera. Whether the horizontal angle between the measured line of the test point and the visible axis of the camera is between k2 and k1 is determined. If the horizontal angle is between k2 and k1, the camera is determined to be the visible camera of the test point. If the horizontal angle is not between k2 and k1, the camera is determined to not be the visible camera of the test point.

Figure 23:
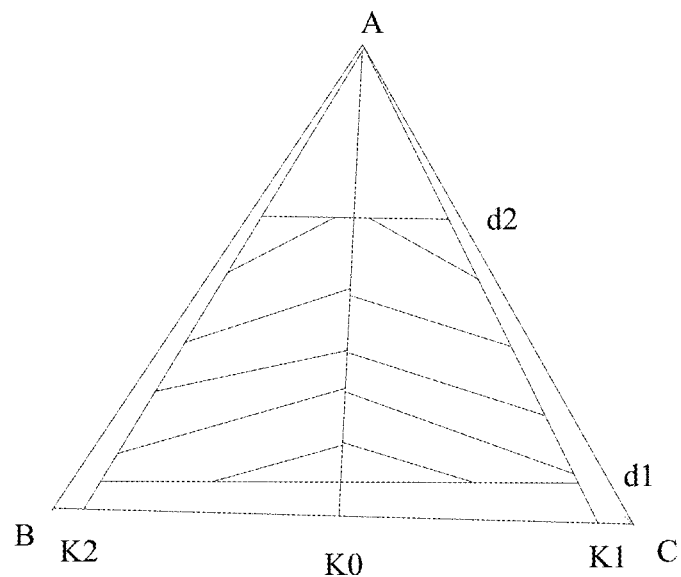

In some embodiments, the first manner and the second manner can be combined. That is, whether the distance between the test point and the center point of the lens plane of the camera is within the preset threshold-range and whether the horizontal angle between the measured line of the test point and the visible axis of the camera is between k2 and k1 can be determined. When the determination results meet both criteria, the camera is determined to be the visible camera of the test point. FIG. 23 schematically shows the visible range of the camera consistent with the disclosure. As shown in FIG. 23, when the test point falls within the closed region (a slashed region shown in FIG. 23) formed by k2, k1, d2, and d1, the camera is determined to be the visible camera of the test point.

Hereinafter, apparatuses that configure the cameras using the above-described camera configuration methods will be described in detail. Terms that have been defined and explained in the camera configuration methods will be omitted here.

The Fifteenth Embodiment

Figure 24:
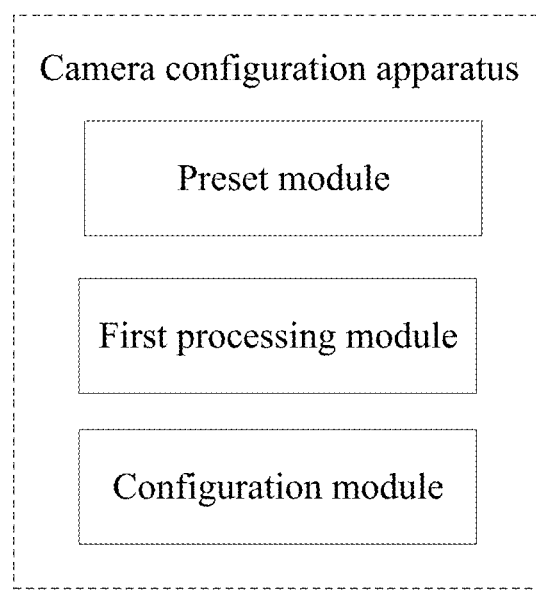
FIG. 24 is a schematic structural diagram of a camera configuration apparatus according to a fifteenth embodiment of the present disclosure.

FIG. 24 is a schematic structural diagram of a camera configuration apparatus consistent with the disclosure. Only portions related to the embodiments of the present disclosure are shown for the convenience of explanation. The camera configuration apparatus shown in FIG. 24 may be the executing entity of the camera configuration method provided in the sixth embodiment, which may be a computer device or a functional unit in the computer device. As shown in FIG. 24, the camera configuration apparatus includes a preset module, a first processing module, and a configuration module.

The preset module is configured, in the preset view region, to determine the preset number of camera configuration modes according to the total number of cameras.

The first processing module is configured to calculate the relative cost value of each camera configuration mode, according to the relative position relationship between each two adjacent visible cameras of each test point in each camera configuration mode.

The configuration module is configured to calculate the configuration cost value of each camera configuration mode based on the relative cost value and determine the final camera configuration mode according to the configuration cost value.

Figure 25:
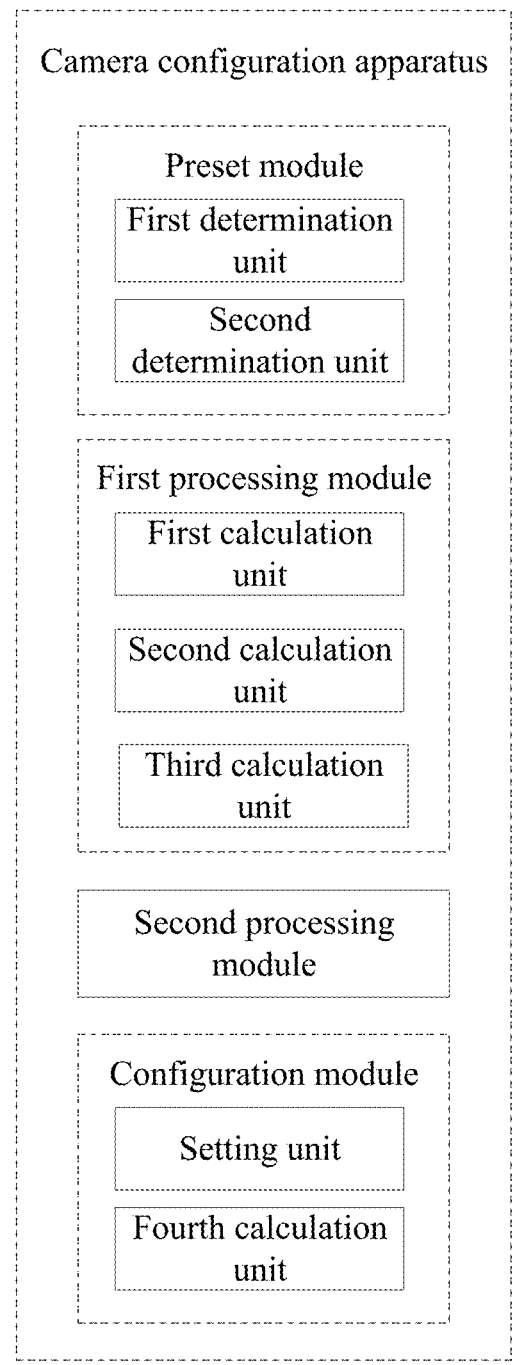
FIG. 25 is a schematic structural diagram of another camera configuration apparatus according to the fifteenth embodiment of the present disclosure.

FIG. 25 is a schematic structural diagram of another camera configuration apparatus consistent with the disclosure. In some embodiments, as shown in FIG. 25, the first processing module includes a first calculation unit, a second calculation unit, and a third calculation unit.

The first calculation unit is configured, in the visible cameras of each test point, to group each two adjacent visible cameras into a camera group and calculate the relative angle formed by the connection lines between the two cameras in each camera group and the corresponding test point.

The second calculation unit is configured to set the relative cost value of each test point, according to the calculated relative angle of each test point and the preset threshold-range of relative angle.

The third calculation unit is configured to accumulate the relative cost value for all test points to obtain the relative cost value of the camera configuration mode.

In some embodiments, the preset threshold-range of relative angle can be [40°, 140°].

In some embodiments, the second calculation unit can be configured to calculate the total number of camera groups of the visible cameras of each test point, count the number of camera groups whose relative angle exceeds the preset threshold-range of relative angle, calculate the ratio of the number of camera groups whose relative angles exceed the preset threshold-range of relative angle to the total number of camera groups, and set the relative cost value of each test point according to the ratio.

In some embodiments, the second calculation unit can be configured to determine whether the calculated relative angle exceeds the preset threshold-range of relative angle, increase the group cost value of the corresponding camera group, if the calculated relative angle exceeds the preset threshold-range of relative angle, decrease or remain the group cost value of the corresponding camera group, if not, and accumulate the group cost value for all camera groups to obtain the relative cost value of the corresponding test point.

As shown in FIG. 25, the configuration module includes a setting unit configured to set the acquisition weight of each test point and a fourth calculation unit configured to calculate the configuration cost value of each camera configuration mode, according to the relative cost value and the acquisition weight of each test point.

In some embodiments, the setting unit can also be configured to determine whether the test point belongs to the preset key acquisition space region, increase the acquisition weight of the test point, if the test point belongs to the preset key acquisition space region, and decrease or remain the acquisition weight of the test point, if not.

The preset module includes a first determination unit and a second determination unit.

The first determination unit is configured to determine whether the distance between the test point and the camera is within the preset threshold-range. If the distance is within the preset threshold-range, the camera is determined to be the visible camera of the test point, otherwise, the camera is determined not to be the visible camera of the test point.

The second determination unit is configured to determine whether the horizontal angle between the measured line of the test point and the view axis of the camera is within the preset angle-threshold-range. If the horizontal angle is within the preset angle-threshold-range, the camera is determined to be the visible camera of the test point, otherwise, the camera is determined not to be the visible camera of the test point.

In some embodiments, the camera configuration apparatus also includes a second processing module.

The second processing module is configured to determine whether the camera configuration mode is valid, according to the height information of each camera and the angle between the view axis of each camera and the horizontal plane. The final camera configuration mode is a valid camera configuration mode.

In some embodiments, the second processing module can determine the camera configuration mode to be valid, if each camera of the camera configuration mode meets one of the following criteria.

1) The height of the camera is greater than the preset first threshold and the angle between the view axis of the camera and the horizontal plane is less than the preset first angle.

2) The height of the camera is less than the preset second threshold and the angle between the view axis of the camera and the horizontal plane is greater than the preset second angle.

3) The height of the camera is within the preset third threshold range and the angle between the view axis of the camera and the horizontal plane is within the preset third angle range.

The Sixteenth Embodiment

Figure 26:
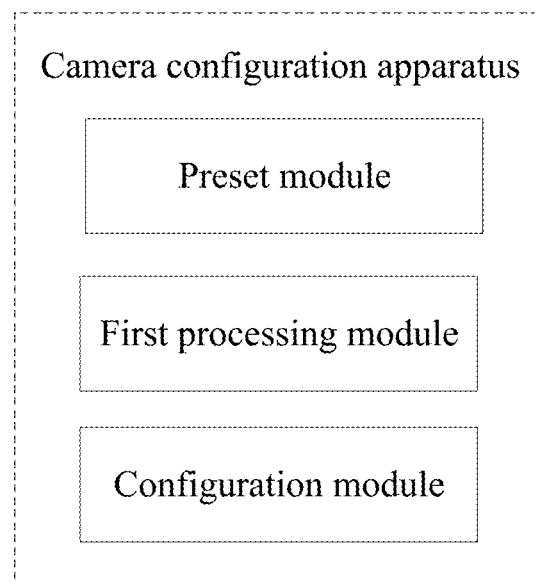
FIG. 26 is a schematic structural diagram of a camera configuration apparatus according to a sixteenth embodiment of the present disclosure.

FIG. 26 is a schematic structural diagram of a camera configuration apparatus consistent with the disclosure. Only portions related to the embodiments of the present disclosure are shown for the convenience of explanation. The camera configuration apparatus shown in FIG. 26 may be the executing entity of the camera configuration method provided in the eighth embodiment, which may be a computer device or a functional unit in the computer device. As shown in FIG. 26, the camera configuration apparatus includes a preset module, a first processing module, and a configuration module.

The preset module is configured, in the preset view region, to determine the preset number of camera configuration modes and the visible cameras of each test point, according to the total number of cameras.

The first processing module is configured to set the acquisition weight of each test point, according to the position information of each test point in the view region for each camera configuration mode.

The configuration module is configured to calculate the configuration cost value of each camera configuration mode and determine the final camera configuration mode according to the configuration cost value of each camera configuration mode.

Figure 27:
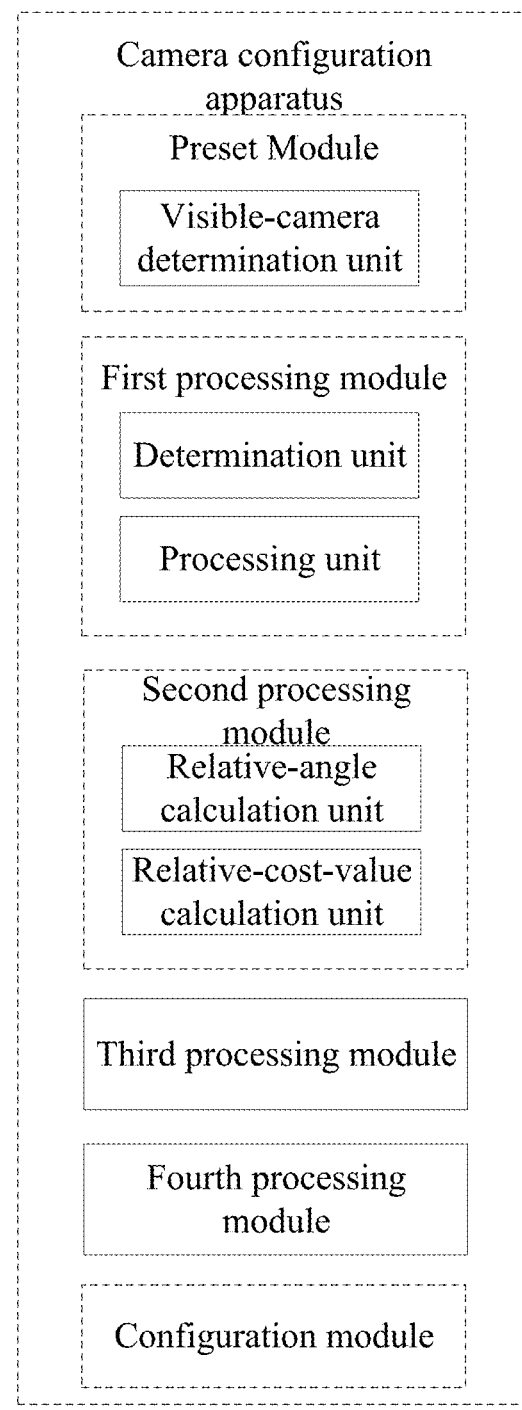
FIG. 27 is a schematic structural diagram of another camera configuration apparatus according to the sixteenth embodiment of the present disclosure.

FIG. 27 is a schematic structural diagram of another camera configuration apparatus consistent with the disclosure. As shown in FIG. 27, the first processing module includes a determination unit and a processing unit.

The determination unit is configured to determine whether the test point belongs to the preset key acquisition space region.

The processing unit is configured to increase the acquisition weight of the test point, if the test point belongs to the preset key acquisition space region, and decrease or remain the acquisition weight of the test point, if not.

The preset module includes a visible-camera determination unit.

The visible-camera determination unit is configured to determine whether the distance between the test point and the camera is within the preset threshold-range, determine the camera to be the visible camera of the test point, if the distance is within the preset threshold-range, and determine the camera not to be the visible camera of the test point, if not, and/or, determine whether the horizontal angle between the measured line of the test point and the view axis of the camera is within the preset angle-threshold-range, determine the camera to be the visible camera of the test point, if the horizontal angle is within the preset angle-threshold-range, and determine the camera not to be the visible camera of the test point, if not.

In some embodiments, the camera configuration apparatus also includes a second processing module. The second processing module includes a relative-angle calculation unit and a relative-cost-value calculation unit.

The relative-angle calculation unit is configured, in the visible cameras of each test point, to group each two adjacent visible cameras into a camera group and calculate the relative angle formed by the connection lines between the two cameras in each camera group and the corresponding test point.

The relative-cost-value calculation unit is configured to set the initial relative cost value of each test point, according to the calculated relative angles and the preset threshold-range of relative angle, multiply the initial relative cost value of each test point by the corresponding acquisition weight to obtain the relative cost value of each test point, and accumulate the relative cost value for all test points to obtain the relative cost value of each camera configuration mode.

In some embodiments, the preset threshold-range of relative angle can be [40°, 140°].

The relative-cost-value calculation unit is configured to calculate the total number of camera groups of the visible cameras of each test point, count the number of camera groups whose relative angle exceeds the preset threshold-range of relative angle, calculate the ratio of the number of camera groups whose relative angle exceeds the preset threshold-range of relative angle to the total number of camera groups, and set the relative cost value of each test point according to the ratio, or, determine whether the calculated relative angle exceeds the preset threshold-range of relative angle, increase the group cost value of the corresponding camera group, if the calculated relative angle exceeds the preset threshold-range of relative angle, decrease or remain the group cost value of the corresponding camera group, if not, and accumulate the group cost value for all camera groups to obtain the relative cost value of the corresponding test point.

In some embodiments, the camera configuration apparatus also includes a third processing module.

The third processing module is configured to determine whether the camera configuration mode is valid, according to the height information of each camera and the angle between the view axis of each camera and the horizontal plane. The final camera configuration mode is a valid camera configuration mode.

In some embodiments, the third processing module can determine the camera configuration mode to be valid, if each camera of the camera configuration mode meets one of the following criteria.

1) The height of the camera is greater than the preset first threshold and the angle between the view axis of the camera and the horizontal plane is less than the preset first angle.

2) The height of the camera is less than the preset second threshold and the angle between the view axis of the camera and the horizontal plane is greater than the preset second angle.

3) The height of the camera is within the preset third threshold range and the angle between the view axis of the camera and the horizontal plane is within the preset third angle range.

In some embodiments, the camera configuration apparatus further includes a fourth processing module configured to calculate the intersection cost value of each camera configuration mode. The intersection cost value identifies the impact of whether the intersection between the view axis of each camera and the horizontal plane falls within the view region on the configuration cost value.

In some embodiments, the fourth processing module can be also configured to determine whether the intersection between the view axis of the camera and the horizontal plane falls within the view region, decrease the intersection cost value of the camera, if yes, increase or remain the intersection cost value of the camera, if not, and accumulate the intersection cost value for all cameras to obtain the intersection cost value of the camera configuration mode.

The Seventeenth Embodiment

Figure 28:
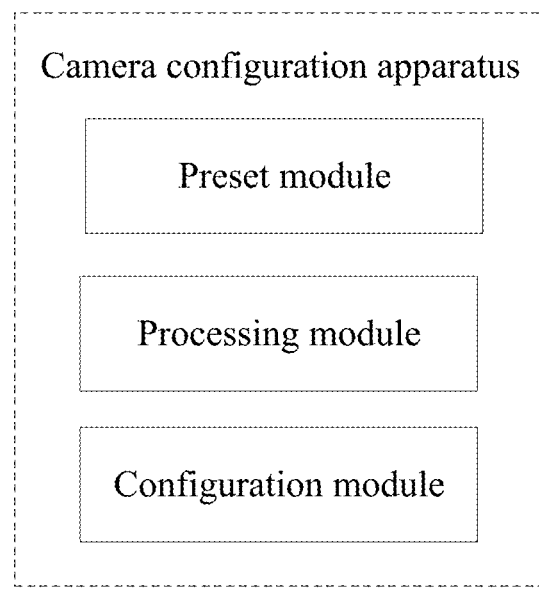
FIG. 28 is a schematic structural diagram of a camera configuration apparatus according to a seventeenth embodiment of the present disclosure.

FIG. 28 is a schematic structural diagram of a camera configuration apparatus consistent with the disclosure. Only portions related to the embodiments of the present disclosure are shown for the convenience of explanation. The camera configuration apparatus shown in FIG. 28 may be the executing entity of the camera configuration method provided in the eleventh embodiment, which may be a computer device or a functional unit in the computer device. As shown in FIG. 28, the camera configuration apparatus includes a preset module, a processing module, and a configuration module.

The preset module is configured, in the preset view region, to determine the preset number of valid camera configuration modes, according to the height information of each camera and the angle between the view axis of each camera and the horizontal plane.

The processing module is configured to calculate the configuration cost value of each camera configuration mode according to the determined camera configuration modes.

The configuration module is configured to determine the final camera configuration mode according to the configuration cost value of each camera configuration mode.

In some embodiments, the preset module can be further configured to determine the camera configuration mode to be valid, if each camera of the camera configuration mode meets one of the following criteria.

1) The height of the camera is greater than the preset first threshold and the angle between the view axis of the camera and the horizontal plane is less than the preset first angle.

2) The height of the camera is less than the preset second threshold and the angle between the view axis of the camera and the horizontal plane is greater than the preset second angle.

3) The height of the camera is within the preset third threshold range and the angle between the view axis of the camera and the horizontal plane is within the preset third angle range.

Figure 29:
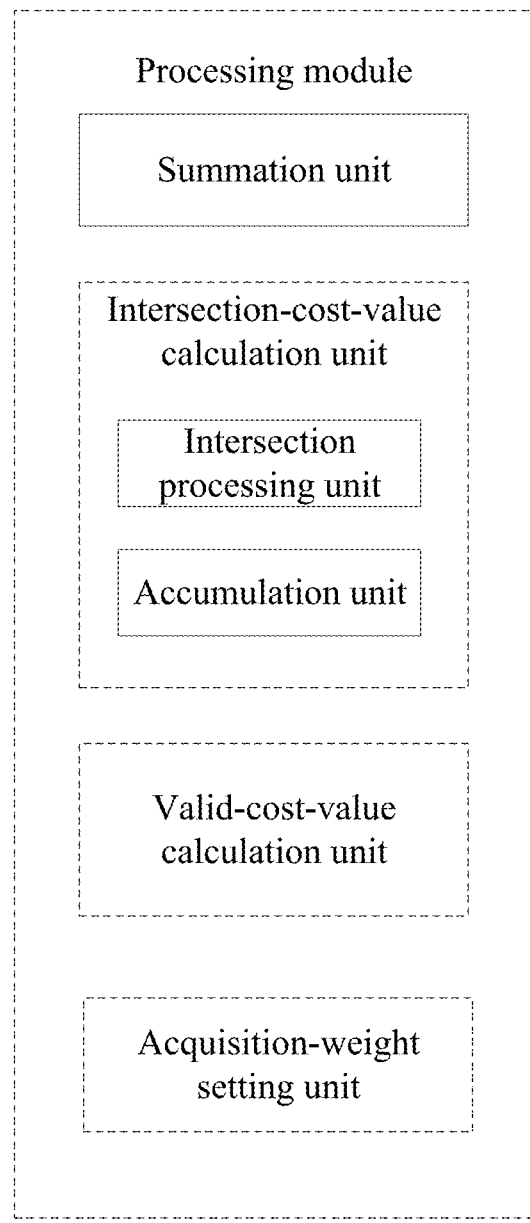
FIG. 29 is a schematic structural diagram of another camera configuration apparatus according to the seventeenth embodiment of the present disclosure.

FIG. 29 is a schematic structural diagram of another camera configuration apparatus consistent with the disclosure. As shown in FIG. 29, the processing module includes an intersection-cost-value calculation unit, a valid-cost-value calculation unit, and a summation unit.

The intersection-cost-value calculation unit is configured to calculate the intersection cost value of each camera configuration mode. The intersection cost value identifies the impact of whether the position of the intersection between the view axis of the camera and the horizontal plane falls within the view region on the configuration cost value.

The valid-cost-value calculation unit is configured to calculate the valid cost value of each test point, according to the determined camera configuration modes.

The summation unit is configured to add the visible cost value and the relative cost value to obtain the configuration cost value of each camera configuration mode.

In some embodiments, the intersection-cost-value calculation unit can also include an intersection processing unit and an accumulation unit.

The intersection processing unit is configured to determine whether the intersection between the view axis of the camera and the horizontal plane falls within the view region, decrease the intersection cost value of the camera, if yes, increase or remain the intersection cost value of the camera, if not.

The accumulation unit is configured to accumulate the intersection cost value for all cameras to obtain the intersection cost value of the camera configuration mode.

In some embodiments, the valid cost value may include the relative cost value. The valid-cost-value unit can be configured, in the visible cameras of each test point, to group each two adjacent visible cameras into a camera group, calculate the relative angle formed by the connection lines between the two cameras in each camera group and the corresponding test point, set the relative cost value of each test point, according to the calculated relative angles and the preset threshold-range of relative angle, and accumulate the relative cost value for all test points to obtain the relative cost value of the camera configuration mode.

In some embodiments, the processing module further includes an acquisition-weight setting unit configured to set the acquisition weight of each test point.

The valid-cost-value calculation unit can be further configured to calculate the valid cost value of each camera configuration mode, according to the determined camera configuration modes and the acquisition weight of each test point.

In some embodiments, the acquisition-weight setting unit can be further configured to determine whether the test point belongs to the preset key acquisition space region, increase the acquisition weight of the test point, if the test point belongs to the preset key acquisition space region, and decrease or remain the acquisition weight of the test point, if not.

The Eighteenth Embodiment

Figure 30:
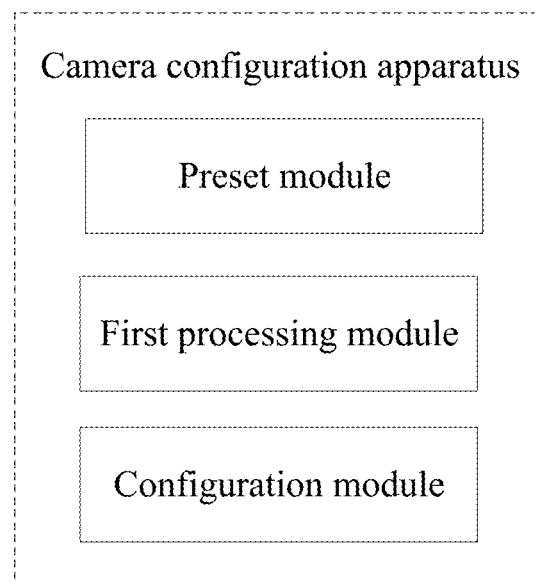
FIG. 30 is a schematic structural diagram of a camera configuration apparatus according to an eighteenth embodiment of the present disclosure.

FIG. 30 is a schematic structural diagram of a camera configuration apparatus consistent with the disclosure. Only portions related to the embodiments of the present disclosure are shown for the convenience of explanation. The camera configuration apparatus shown in FIG. 30 may be the executing entity of the camera configuration method provided in the thirteenth embodiment, which may be a computer device or a functional unit in the computer device. As shown in FIG. 30, the camera configuration apparatus includes a preset module, a first processing module, and a configuration module.

The preset module is configured, in the preset view region, to determine the preset number of camera configuration modes according to the total number of cameras.

The first processing module is configured to calculate the intersection cost value of each camera configuration mode, according to the position of the intersection between the view axis of each camera of each camera configuration mode and the horizontal plane.

The configuration module is configured to calculate the configuration cost value of each camera configuration mode according to the intersection cost value and determine the final camera configuration mode according to the configuration cost value of each camera configuration mode.

Figure 31:
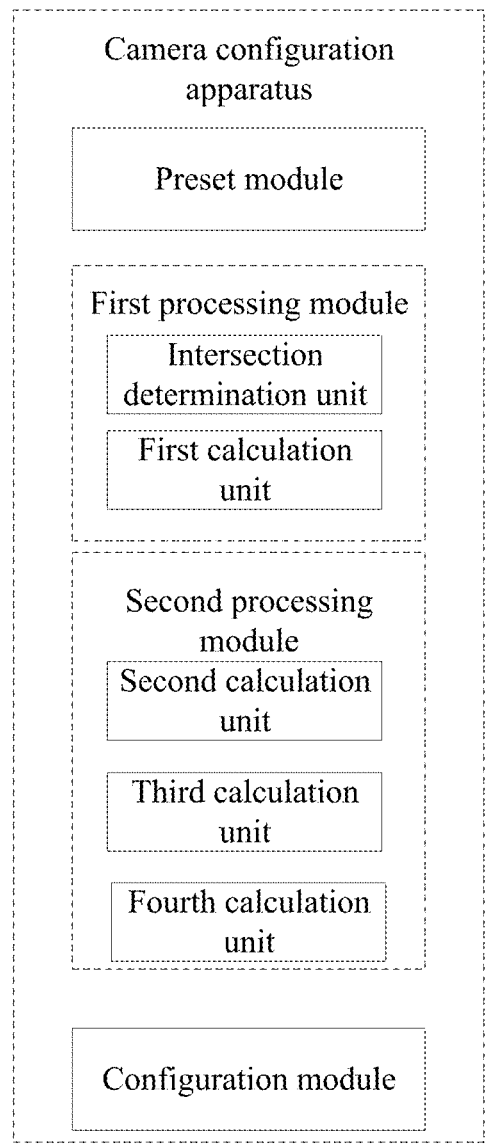
FIG. 31 is a schematic structural diagram of another camera configuration apparatus according to the eighteenth embodiment of the present disclosure.

FIG. 31 is a schematic structural diagram of another camera configuration apparatus consistent with the disclosure. As shown in FIG. 31, the first processing module includes an intersection determination unit and a first calculation unit.

The intersection determination unit is configured to determine whether the intersection between the view axis of the camera and the horizontal plane falls within the view region, decrease the intersection cost value of the camera, if yes, and increase or remain the intersection cost value of the camera, if no.

The first calculation unit is configured to accumulate the intersection cost value for all cameras to obtain the intersection cost value of the camera configuration mode.

In some embodiments, the camera configuration apparatus further includes a second processing module. The second processing module includes a second calculation unit, a third calculation unit, and a fourth calculation unit.

The second calculation unit is configured to determine the visible cameras of each test point in each camera configuration mode, according to the determined camera configuration modes, group two adjacent visible cameras in the visible cameras of each test point into the camera group, and calculate the relative angle formed by the connection lines between the two cameras in the camera group and the corresponding test point.

The third calculation unit is configured to set the relative cost value of each test point, according to the calculated relative angles and a preset threshold-range of relative angle.

The fourth calculation unit is configured to accumulate the relative cost value for all test points to obtain the relative cost value of the camera configuration mode.

The configuration module can also be configured to add the intersection cost value and the relative cost value to obtain the configuration cost value of each camera configuration cost value.

In some embodiments, the preset threshold-range of relative angle can be [40°, 140°].

In some embodiments, the third calculation unit can also be configured to calculate the total number of camera groups of the visible cameras of each test point, count the number of camera groups whose relative angle exceeds the preset threshold-range of relative angle, calculate the ratio of the number of camera groups whose relative angle exceeds the preset threshold-range of relative angle to the total number of camera groups, and set the relative cost value of each test point according to the ratio.

In some embodiments, the third calculation unit can also be configured to determine whether the calculated relative angle exceeds the preset threshold-range of relative angle, increase the group cost value of the corresponding camera group, if the calculated relative angle exceeds the preset threshold-range of relative angle, decrease or remain the group cost value of the corresponding camera group, if not, and accumulate the group cost value for all camera groups to obtain the relative cost value of the corresponding test point.

In some embodiments, the second calculation unit can also be configured to determine whether the distance between the test point and the camera is within the preset threshold-range, determine the camera to be the visible camera of the test point, if the distance is within the preset threshold-range, and determine the camera not to be the visible camera of the test point, if not, and/or, determine whether the horizontal angle between the measured line of the test point and the view axis of the camera is within the preset angle-threshold-range, determine the camera to be the visible camera of the test point, if the horizontal angle is within the preset angle-threshold-range, and determine the camera not to be the visible camera of the test point, if not.

In some embodiments, the preset module can also be configured to determine whether the camera configuration mode is valid, according to the height information of each camera and the angle between the view axis of each camera and the horizontal plane.

The Ninteenth Embodiment

A camera configuration apparatus includes a memory and a processor. The memory is configured to store programs, when executed, caused the processor to implement any one of the camera configuration method in sixth embodiment to eighteenth embodiment.

It will be apparent to a person skilled in the art that the specific processes of the apparatus and units described-above may be referred to the corresponding processes in the foregoing embodiments of the method and will not be described further herein for the convenience and simplicity of the description.

In several embodiments provided herein, it should be understood that the disclosed systems, apparatus, and methods may be implemented in other ways. For example, the embodiment of the apparatus described-above is merely illustrative. For example, the division of the units is only a logical function division, and there may be additional ways of actually implementing. For example, multiple units or components may be combined or can be integrated into another system, or some feature can be ignored, or not executed. In other respects, the mutual coupling or direct coupling or communication connection shown or discussed may be either an indirect coupling via some communication interfaces, apparatus, or units, or a communication connection, and may be electrical type, mechanical type, or other types.

The units described as the separate parts may or may not be physically separate, and the components shown as units may or may not be physical units, i.e., may be located in one place or may be distributed over a plurality of network elements. The part or all of the units may be selected according to the actual needs to achieve the objective of the present embodiment.

In addition, the functional units in various embodiments of the present disclosure may be integrated into one processing unit or each unit may be physically present, or two or more units may be integrated into one unit.

If functions are implemented in the form of a software functional unit, and sold or used as a separate product, the functions may be stored in a computer-readable storage medium. Based on this understanding, the technical solution of the present disclosure, in essence, or in the form of a prior art, can be embodied in the form of a software product, the software product stored in a storage medium, includes a number of instructions for enabling a computer device (which may be a mobile phone, a computer, a server, or a network device, etc.) to perform all or part of the method described in the various embodiments of the present disclosure. The aforementioned storage medium includes various mediums that can store instructions, such as a USB disk, a mobile hard disk, a Read-Only Memory (ROM), a Random Access Memory, a magnetic disk, or an optical disk, and the like.

The embodiments disclosed herein are exemplary only. Other applications, advantages, alternations, modifications, or equivalents to the disclosed embodiments are obvious to a person skilled in the art and are intended to be encompassed within the scope of the present disclosure.

What is claimed is:

1. A camera configuration method, comprising:
   determining, in a preset view region, a preset number of camera configuration modes and visible cameras of each test point, according to a total number of cameras;
   calculating one or more cost values of each camera configuration mode, according to one or more factors that affect a capture effect; and
   calculating a configuration cost value of each camera configuration mode, according to the one or more cost values of each camera configuration mode, to determine a final camera configuration mode.

2. The method of claim 1, wherein calculating the one or more cost values of each camera configuration mode includes:
   calculating a relative cost value of each camera configuration mode, according to a relative position relationship between each two adjacent visible cameras of each test point of each camera configuration mode; and
   calculating an intersection cost value of each camera configuration mode, according to a position of an intersection between a view axis of each camera of each camera configuration mode and a horizontal plane.

3. The method of claim 2, wherein calculating the relative cost value of each camera configuration mode includes:
   grouping each two adjacent visible cameras of the visible cameras of each test point into a camera group;
   calculating a relative angle formed by connection lines between the two cameras in each camera group and the corresponding test point;
   setting the relative cost value of each test point, according to the relative angle of each camera group of each test point and a preset threshold-range of relative angle; and
   accumulating the relative cost values for all test points to obtain the relative cost value of each camera configuration mode.

4. The method of claim 3, wherein setting the relative cost value of each test point includes:
   calculating a total number of camera groups of the visible cameras of each test point;
   counting the number of camera groups whose relative angles exceed the preset threshold-range of relative angle;
   calculating a ratio of the number of camera groups whose relative angles exceed the preset threshold-range of relative angle to the total number of camera groups; and
   setting the relative cost value of each test point, according to the ratio.

5. The method of claim 3, wherein setting the relative cost value of each test point further includes:
   determining whether the relative angle exceeds the preset threshold-range of relative angle;
   in response to the relative angle exceeding the preset threshold-range of relative angle, increasing a group cost value of the corresponding camera group;
   in response to the relative angle not exceeding the preset threshold-range of relative angle, decreasing the group cost value of the corresponding camera group or remaining the group cost value of the corresponding camera group unchanged; and
   accumulating the group cost values for all camera groups to obtain the relative cost value of each test point.

6. The method of claim 2, wherein calculating the intersection cost value of each camera configuration mode includes:
   determining whether the intersection between the view axis of the camera and the horizontal plane falls within the view region;
   in response to the intersection between the view axis of the camera and the horizontal plane falling within the view region, decreasing the intersection cost value of the camera;
   in response to the intersection between the view axis of the camera and the horizontal plane not falling within the view region, increasing the intersection cost value of the camera or remaining the intersection cost value of the camera unchanged; and
   accumulating the intersection cost values for all cameras to obtain the intersection cost value of each camera configuration mode.

7. The method of claim 2, further including:
   setting an acquisition weight of each test point of each camera configuration mode, according to position information of each test point in the view region; and
   calculating the configuration cost value of each camera configuration mode, according to the one or more cost values of each camera configuration mode and the acquisition weight of each test point of each camera configuration mode,
   wherein setting the acquisition weight of each test point includes:
      determining whether the test point belongs to a preset key acquisition space region;
      in response to the test point belonging to the preset key acquisition space region, increasing the acquisition weight of the test point; and
      in response to the test point not belonging to the preset key acquisition space region, decreasing the acquisition weight of the test point or remaining the acquisition weight of the test point unchanged.

8. The method of claim 7, wherein calculating the configuration cost value of each camera configuration mode includes:
   multiplying the relative cost value of each test point by the corresponding acquisition weight;

accumulating the weighted relative cost values for all test points to obtain the weighted relative cost value of each camera configuration mode; and summing the weighted relative cost value of each camera configuration mode and the intersection cost value of each camera configuration mode to obtain the configuration cost value of each camera configuration mode.

9. The method of claim 1, wherein determining the preset number of camera configuration modes includes:
determining a plurality of valid camera configuration modes, according to whether height information of each camera and an angle between a view axis of each camera and a horizontal plane satisfies one of determination criteria, wherein the determination criteria includes:
a height of each camera is greater than a preset first threshold and the angle between the view axis of each camera and the horizontal plane is less than a preset first angle;
the height of each camera is less than a preset second threshold and the angle between the view axis of each camera and the horizontal plane is greater than a preset second angle; and
the height of each camera is within a preset third threshold range and the angle between the view axis of each camera and the horizontal plane is within a preset third angle range.

10. The method of claim 1, wherein determining the visible cameras of each test point includes:
determining whether the test point belongs to a visible range of the camera;
determining whether a distance between the test point and the camera is within a preset threshold-range;
in response to the distance being within the preset threshold-range, determining the camera to be the visible camera of the test point; and
in response to the distance not being within the preset threshold-range, determining the camera not to be the visible camera of the test point;
and
determining whether a horizontal angle between a measured line of the test point and a view axis of the camera is within a preset angle-threshold-range;
in response to the horizontal angle being within the preset angle-threshold-range, determining the camera to be the visible camera of the test point; and
in response to the horizontal angle not being within the preset angle-threshold-range, determining the camera not to be the visible camera of the test point.

11. A camera configuration apparatus, comprising:
a processor; and
a memory stored program, when executed, causing the processor to:
determine, in a preset view region, a preset number of camera configuration modes and visible cameras of each test point, according to a total number of cameras;
calculate one or more cost values of each camera configuration mode, according to one or more factors that affect a capture effect; and
calculate a configuration cost value of each camera configuration mode, according to the one or more cost values of each camera configuration mode, to determine a final camera configuration mode.

12. The apparatus of claim 11, wherein the program further causes the processor to:
calculate a relative cost value of each camera configuration mode, according to a relative position relationship between each two adjacent visible cameras of each test point of each camera configuration mode; and
calculate an intersection cost value of each camera configuration mode, according to a position of an intersection between a view axis of each camera of each camera configuration mode and a horizontal plane.

13. The apparatus of claim 12, wherein the program further causes the processor to:
group each two adjacent visible cameras of the visible cameras of each test point into a camera group;
calculate a relative angle formed by connection lines between the two cameras in each camera group and the corresponding test point;
set the relative cost value of each test point, according to the relative angle of each camera group of each test point and a preset threshold-range of relative angle; and
sum the relative cost values for all test points to obtain the relative cost value of each camera configuration mode.

14. The apparatus of claim 13, wherein the program further causes the processor to:
calculate a total number of camera groups of the visible cameras of each test point;
count the number of camera groups whose relative angles exceed the preset threshold-range of relative angle;
calculate a ratio of the number of camera groups whose relative angles exceed the preset threshold-range of relative angle to the total number of camera groups; and
set the relative cost value of each test point, according to the ratio.

15. The apparatus of claim 13, wherein the program further causes the processor to:
determine whether the relative angle exceeds the preset threshold-range of relative angle;
in response to the relative angle exceeding the preset threshold-range of relative angle, increase a group cost value of the corresponding camera group;
in response to the relative angle not exceeding the preset threshold-range of relative angle, decrease the group cost value of the corresponding camera group or remain the group cost value of the corresponding camera group unchanged; and
sum the group cost values for all camera groups to obtain the relative cost value of each test point.

16. The apparatus of claim 12, wherein the program further causes the processor to:
determine whether the intersection between the view axis of the camera and the horizontal plane falls within the view region;
in response to the intersection between the view axis of the camera and the horizontal plane falling within the view region, decrease the intersection cost value of the camera;
in response to the intersection between the view axis of the camera and the horizontal plane not falling within the view region, increase the intersection cost value of the camera or remain the intersection cost value of the camera unchanged; and
sum the intersection cost values for all cameras to obtain the intersection cost value of each camera configuration mode.

17. The apparatus of claim 12, wherein the program further causes the processor to:

set an acquisition weight of each test point of each camera configuration mode, according to position information of each test point in the view region; and calculate the configuration cost value of each camera configuration mode, according to the one or more cost values of each camera configuration mode and the acquisition weight of each test point of each camera configuration mode, wherein the program further causes the processor to:
  determine whether the test point belongs to a preset key acquisition space region;
  in response to the test point belonging to the preset key acquisition space region, increase the acquisition weight of the test point; and
  in response to the test point not belonging to the preset key acquisition space region, decrease the acquisition weight of the test point or remain the acquisition weight of the test point unchanged.

18. The apparatus of claim 17, wherein the program further causes the processor to:
  multiply the relative cost value of each test point by the corresponding acquisition weight;
  sum the weighted relative cost values for all test points to obtain the weighted relative cost value of each camera configuration mode; and
  sum the weighted relative cost value of each camera configuration mode and the intersection cost value of each camera configuration mode to obtain the configuration cost value of each camera configuration mode.

19. The apparatus of claim 11, wherein the program further causes the processor to:
  determine a plurality of valid camera configuration modes, according to whether height information of each camera and an angle between a view axis of each camera and a horizontal plane satisfies one of determination criteria, wherein the determination criteria includes:
    a height of each camera is greater than a preset first threshold and the angle between the view axis of each camera and the horizontal plane is less than a preset first angle;
    the height of each camera is less than a preset second threshold and the angle between the view axis of each camera and the horizontal plane is greater than a preset second angle; and
    the height of each camera is within a preset third threshold range and the angle between the view axis of each camera and the horizontal plane is within a preset third angle range.

20. The apparatus of claim 11, wherein the program further causes the processor to:
  determine whether the test point belongs to a visible range of the camera;
  determine whether a distance between the test point and the camera is within a preset threshold-range;
  in response to the distance being within the preset threshold-range, determine the camera to be the visible camera of the test point; and
  in response to the distance not being within the preset threshold-range, determine the camera not to be the visible camera of the test point;
  and
  determine whether a horizontal angle between a measured line of the test point and a view axis of the camera is within a preset angle-threshold-range;
  in response to the horizontal angle being within the preset angle-threshold-range, determine the camera to be the visible camera of the test point; and
  in response to the horizontal angle not being within the preset angle-threshold-range, determine the camera not to be the visible camera of the test point.

* * * * *